United States Patent
Manohar et al.

(10) Patent No.: US 6,572,662 B2
(45) Date of Patent: Jun. 3, 2003

(54) DYNAMIC CUSTOMIZED WEB TOURS

(75) Inventors: Nelson R. Manohar, Yonkers, NY (US); Marc Hubert Willebeek-LeMair, Yorktown Heights, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/079,661

(22) Filed: May 15, 1998

(65) Prior Publication Data

US 2002/0002571 A1 Jan. 3, 2002

(51) Int. Cl.[7] .................. G06F 15/00; G06F 17/21; G06F 15/16
(52) U.S. Cl. .................. 715/526; 707/10; 709/218; 709/227
(58) Field of Search .................. 705/526; 709/218, 709/219, 227, 203; 707/526, 10

(56) References Cited

U.S. PATENT DOCUMENTS

| | | | |
|---|---|---|---|
| 5,459,306 A | 10/1995 | Stein et al. | 235/383 |
| 5,504,675 A | 4/1996 | Cragun et al. | 364/401 |
| 5,572,643 A * | 11/1996 | Judson | 709/218 |
| 5,717,860 A * | 2/1998 | Graber et al. | 709/227 |
| 5,809,247 A * | 9/1998 | Richardson et al. | 709/218 |
| 5,918,014 A * | 6/1999 | Robinson | 709/219 |
| 5,991,740 A * | 11/1999 | Messer | 705/26 |
| 6,009,429 A * | 12/1999 | Greer et al. | 707/10 |
| 6,182,072 B1 * | 1/2001 | Leak et al. | 707/10 |

FOREIGN PATENT DOCUMENTS

| | | |
|---|---|---|
| EP | 0820024 A2 | 1/1998 |
| EP | 0822535 A2 | 2/1998 |
| EP | 0820024 A3 | 6/1998 |

OTHER PUBLICATIONS

Joachims, Thorsten et al., WebWatcher: A Tour Guide for the World Wide Web, Proceedings of IJCAI97, pp. 1–7 Aug. 1997.*
Lieberman, Henry, Letizia: An Agent That Assists Web Browsing, Proceedings of the ACM Conference on Computers and Human Interface, PP. 1–11 Mar 1997.*
Microsoft Press Computer Dictionary, Third Edition, Microsoft Press, pp. 171–172 1997.*
Messmer, Ellen, Contigo upgrades tool for guided Web tours, Network World, Framingham, Jul. 14, 1997, vol. 14 Issue 28 p. 34.*
Bowers, Richard, Java Tool Takes Groups On Guided Web Tours, Newsbytes News Network, Jan. 28, 1997, p. 1.*
Merriam–Webster's Collegiate Dictionary, Tenth Edition, 1997 Merriam–Webster, Incorporated, pp. 1094, 1196.*
Thomas, B., Recipe for e–commerce, IEEE Internet Computing, vol. 1, Issue 6, pp. 72–74 Dec. 1997.*

(List continued on next page.)

Primary Examiner—Joseph H. Feild
Assistant Examiner—William L. Bashore
(74) Attorney, Agent, or Firm—F. Chau & Associates, LLP

(57) ABSTRACT

An interactive and dynamically customizable guided tour of some portion of the World Wide Web monitors and dynamically adapts in response to like-minded users as well as provides recommendations during the traversal. The invention includes features for: electronic commerce; side trips; true visiting of Web sites; maps; pre-fetching of Web objects; insertion of interactive decision points; customized insertion of advertisements; simultaneous traversal of multiple hyperpaths; collection of and dynamic modification of a tour based on collected route information and/or touring statistics.

25 Claims, 22 Drawing Sheets

OTHER PUBLICATIONS

Lee, J.K.W. et al., Intelligent agents for matching information providers and consumers on the World–Wide–Web, IEEE System Sciences, vol. 4, pp. 189–199 Jan 1997.*

Hedberg, S., Agents for sale: first wave of intelligent agents go commercial, IEEE Expert, vol. 11, Issue 6, pp. 16–19 Dec 1996.*

Hsinchum Chen et al., Intelligent spider for Internet searching, IEEE System Sciences, vol. 4, pp.178–188 Jan. 1997.*

Barrett, Rob et al., How to personalize the Web, ACM Conference on Human Factors and Computing Systems, pp. 75–82 Mar. 1997.*

Dharap, Chandra et al., Information agents for automated browsing, ACM Conference on Information and Knowledge Management, pp. 296–305 Nov. 1996.*

Andre, Elizabeth et al., Guiding the user through dynamically generated hypermedia presentations with a life–like character, ACM International Conference on Intelligent User Interfaces, pp. 21–28 Jan. 1998.*

Guinan, C. et al., Information retrieval from hypertext using dynamically planned guided tours, ACM conference on Hypertext, pp. 122–130.*

S. Ravindran et al., "Strategies for Smart Shopping in cyberspace", Journal of Organizational Computing and Electronic Commerce 6(1), 33–49, (1996).

Andreas Dieberger, "Browsing the WWW by interacting with a textual virtual enviroment—A framerwork for experimenting with navigational metqphors", http://www.cs.unc.edu/~barman/HT96/P25/ht96.html, pp. 1–18, in ( Proc. Of ACM Hypertext'96, Washington DC, Mar. 1996, pp. 170–179.) (With attached Abstract).

Jeff Conklin, 'Survey and Tutorial Series', "Hypertext: An Introduction and Survey", IEEE, Computer, pp. 17–41, Sep. 1987.

Vannevar Bush, "As We May Think", The Atlantic Monthly, 19 pages, Jul. 1945.

Whit Andrews, 'Marketing & Commerce'—"Excite Launches a Web Tour Service", http://www.webweek.com/96Oct21/markcomm/excite.html., 1 pages, Oct. 21, 1996.

Lauriston Girls School, Home Page, "Virtual Guided Tour", URL: http://www.Lauriston.vic.edu.au/eliza/tour.htm.

Gordon McComb, 'JavaScript™ Sourcebook'—Create Interactive JavaScript Programs for the World Wide Web, Wiley Computer Publishing, Title page & Introductory page, Chapter 17, 'Using Javascript with Advanced HTML', pp. 526–531, (1996).

Nelson R. Manohar et al., "The Session Capture and Replay Paradigm for Asynchronous Collaboration", Proceedings of the Fourth ECSCW Conference, pp. 149–164, Stockholm, Sweden, Sep. 1995.

Michael Bieber, 'Fourth Generation Hypermedia', "Fourth Generation Hypermedia: Some Missing Links for the World Wide Web", http://www.cs.unibo.it/~fabio/bio/papers/1997/IJHCS97/Issuev57.html, 34 pages, (1997).

J. Crowcroft et al., Touring and navigating a global learning environment–the Web. (1994).

Jaczynski et al., "Broadway: A World Wide Web Browsing Advisor Reusing Past Navigations from a Group of Users," Proceedings of $3^{rd}$ UK Workshop on Case–Based Reasoning (UKCBR3), 1997, XP002140919.

Franz J. Hauck "Supporting Hierarchical Guided Tours In The World Wide Web", Computer Networks and ISDN Systems, vol. 28, pp. 1233–1242, (1996).

Jühne et al, "Ariadne: a Java–based guided tour system for the World Wide Web", Computer Networks and ISDN Systems, vol. 30, pp. 131–139 (1998).

Nicol et al., "Footsteps: Trail–blazing the Web", Computer Networks and ISDN Systems, vol. 27, pp. 879–885 (1995).

Barrett et al., "How to Personalize the Web", IBM Almaden Research Center, Conference on Human Factors in Computing Systems, Atlanta, CA, USA, pp. 79–82, (1997).

M. Jaczynski et al., WWW Assisted Browsing by Reusing Past Navigations of a Group of Users, Lecture Notes In Artificial Intelligence 1488, $4^{th}$European Workshop, pp. 160–167 1998.

Jaczynski et al., "Broadway, a Case–Based Browsing Advisor for the Web", Research and Advanced Technology for Digital Libraries; Second European Conference, ECDL '98; Proceedings, Researchand Advanced Technology for Digital Libraries; Second European Conference; ECDL '98, pp. 697–698, 1998.

* cited by examiner

Touring Sequence (A→B) ⤺— 1010

Touring FDRK (A→B x C) ⤺—1040

Touring Meet (B x C)→A ⤺—1060

Touring Anchor A→(B x C) ⤺—1030

Touring Option A→B + B x C ⤺—1080

For Token Bag = △ ← 1330
Approx. 10 Minute Tour Is

1340

DYNAMIC CUSTOMIZED WEB TOURS

CROSS-REFERENCE TO RELATED APPLICATIONS

The present invention is related to co-pending patent application Ser. No. 08/969,623, entitled "HTML Guided Web Tour", filed Nov. 13, 1997, by W. J. Roden. This copending application and the present invention are commonly assigned to the International Business Machines Corporation, Armonk, N.Y. This co-pending application is hereby incorporated by reference in its entirety into the present application.

FIELD OF THE INVENTION

The present invention relates to techniques for assisted network navigation. In particular, the present invention relates to methods for providing a user of the Internet with a guided tour of the World Wide Web (WWW) and to techniques for assisting in the navigation of Web objects spread among multiple Web sites; and even more particularly, to an intelligent Web browsing system that dynamically adapts a tour based on collected route information, touring statistics, or similarity to to one or more like-minded users.

BACKGROUND

What is a Web page today? Today, a user experiences the Web in an a-temporal fashion through the use of Web objects. Web objects are uniquely identified by unique resource locators (URLs). URLs and their associated bookmarks are the basic mechanisms of exchange among users. There are three fairly obvious existing methods to guide a Web surfing session that spans multiple Web sites (hereinafter referred to as touring). One is simply to create an HTML file with commentary and links to the sites on the tour. Of course, in this case one must back up from each site to be presented with the next link. Another way is to make copies of all pages on the tour, save them on your own Web page, and modify them as suits your purposes. A third way is described in te aforementioned co-pending patent application Ser. No. 08/969,623, entitled "HTML Guided Web Tour," filed Nov. 13, 1997, IBM Docket No. EN997116, by W. J. Roden, et al. Here, a static tour is presented wherein the system guides the users through a tour by displaying a given sequence of Web objects along with corresponding teaching Web objects. Users desire the ability for more complex forms of asynchronous interactions [see e.g., Manohar and Prakash, "The Session Capture and Replay Paradigm for Asynchronous Collaboration", Proc. of the European Conference on Computer Supported Collaborative Work, September 1995, Sweden].

What is a tour? A tour refers to a collection of objects, e.g., Web objects (such as URLs) that are temporally ordered. A tour represents an interactive visitation pattern over a dynamic collection of Web objects (for example, objects such as Web pages). A tour is different from a Web page. Tours are composed of two or more Web objects, which in turn, could be each a Web page. However, Web objects are used herein to represent any sort of Web resource that can be referenced through a handle such as a universal resource locator (URL). Furthermore, a tour is logically different from an arbitrary collection of Web objects such as a Web site. Tour objects can span multiple Web sites with intertwined links. The tour presents a view to an augmented virtual Web site across multiple underlying Web sites that spans coordinated visitation patterns that may not be present or realizable without copying the objects from the original sites. A tour is also different from a collection of URL bookmarks. Unlike a collection of bookmarks, a tour associates a temporal ordering with the presentation of Web objects that recreates a time-constrained visitation pattern across the collection of Web objects in the tour.

Hypermedia systems that allow the user to navigate through large amounts of on-line information are known to be a promising method for controlling the overwhelming increase in information available to the user. While most paper documents lead the user down a rigid sequential path, hypertext documents provide users with a means to choose one of many different paths. Hypertext is a familiar term used to describe a particular form of organization and user presentation of information within a computer-implemented system and is a familiar element of the broader class of systems referred to herein as hypermedia. Hypermedia exploit the computer's ability to link together information from a wide variety of sources as a tool for exploring a particular topic. The data object is said to reside at a "node" and may vary in size and type. Each data object is essentially self-contained but may contain references to other such objects or nodes. Such references are normally used in a hypertext document and are referred to as "links". A link is a user-activated control reference that causes the data object at the link target node to be displayed. By following these links from panel to panel, the user "navigates" through and about the hypertext document. This scheme provides user-control over the order of information presentation and permits the user to select what is of interest and how to pursue a given topic. An introductory treatment of hypertext is provided in "Hypertext: An Introduction and Survey", IEEE Computer, J. Conklin, Vol. 20, pp. 17–41, (1987), and is hereby incorporated herein by reference in its entirety.

The World Wide Web is a hypertext-based information service that makes collections of information available across the Internet. It allows Web browser clients to access information from any accessible Web server and supports multiple media types. Hypertext Markup Language (HTML) is used to describe static text documents, and a Web browser is essentially an HTML interpreter. A Uniform Resource Locator (URL) is basically a network location which tells the user not only where something is (its address), but also what it is. The basic form of a URL address is service:// hostname/path which identifies what Internet service is needed to reach the resource, what computer it is located on, and enough detail to find what is being searched for. By clicking on a hypertext link in one Web page, the user can display another related Web page or even invoke a related program. With the explosion of information on the World Wide Web, there are many potential new users who would like to search for information on the World Wide Web. The problem is that there is no effective interactive system for guiding a user through a tour of the World Wide Web which uses actual Web pages. The existing art minimizes these problems by constraining the available choices in linking from one panel to another. This is done by providing only a few carefully chosen links to and from each panel. Thus, users are less likely to get lost or waste time exploring irrelevant nodes, but lack flexibility. The typical hypertext link profile is predetermined according to the system designer's understanding of the typical user profile and is incorporated in the hypertext document with no provision for modification or weighted recommendation.

A tour is different from hyper-pathing over a closed collection of objects [see Vannebar Bush, "As We May think," The Atlantic, 1945]. Unlike a closed collection such as a hyperlinked stack of cards (also called hypercards), a need exists for a tour that applies over an open (dynamic) collection of objects whose membership in the collection varies over time (ephemeral membership). Because pathing in a closed collection is an internal attribute of the collection, the absence of an object with membership in the tour will break the continuity of the tour. Thus, a need exists for a tour that is a separate object from the collection itself, so that the continuity of the view imposed by a tour over the collection is unaffected by the absence of one or more of its objects. Moreover, a need exists for a tour that may span paths not present in the original underlying collection. On the other hand, a hyper-path must traverse physical links in the collection. Lastly, the notion of hyperpathing refers to sequential traversals over a hypergraph. The need remains for a tour that encompasses the temporal coordination of multiple such sequential traversals during the presentation of a tour, e.g., by a Web browser.

The prior art also includes mechanisms to present a tour of a static collection of Web objects of interest. For example, in "HTML Guided Web Tour", filed Nov. 13, 1997, IBM Docket No. EN997116, by W. J. Roden, et al, a static tour is presented where the system guides the users through a tour by displaying a given sequence of Web objects along with corresponding teaching Web objects. The sequence is pre-constructed. It does not collect user statistics or provide different tour options, such as a short tour (with a fewer number of Web objects) or a long tour. In "Browsing the WWW by interacting with a textual virtual environment—A Framework for Experimenting with Navigational Metaphors," in ACM Hypertext '96, March 1996, pp. 170–179, by A. Diebeger, a text-only, but information-rich spatial user interface is described wherein objects and a location/room can be associated with pointers to WWW objects. Here, the tour concept is only a sequence of Web objects. No control mechanism is provided for the displaying of the Web objects, i.e., there is no control for the timing and synchronization of displaying the Web objects, e.g., to allow some of the objects to be displayed in parallel through multiple frames. Although a visiting count is collected on each room in the Dieberger paper, the need remains for feedback information based on a viewers previous route decisions during the tour to guide subsequent routing decisions on the remainder of the tour by learning from other viewers making similar routing decisions.

Thus, there is a need for an adaptive user interface simple enough for effective use in Web browsing systems, permitting a tour to be adapted to various users while retaining efficiency and flexibility. These and the related unresolved problems and deficiencies are solved by the present invention in the manner described below.

OBJECTS OF THE INVENTION

It is therefore an object of the present invention to provide an interactive and customizable guided tour of some portion of the World Wide Web; and to monitor and dynamically adapt the tour in response to information such as the behavior of like-minded users; as well as provide recommendations during the traversal. A tour having features of the present invention includes one or more of the following features:

Two or more Web objects,
Allowance for side trips,
True visiting of Web sites,
Maps,
Pre-fetching of Web objects,
Insertion of interactive decision points,
Customized insertion of advertisements,
Simultaneous traversal of multiple hyperpaths,
Gathering of user touring statistics, and
Dynamic recommendation based on touring statistics.

Another object of the present invention is to enhance the use and exchange of bookmark lists in several ways. For example, the use of a touring server acting as an intelligent intermediary between touring clients and the Web, is introduced. The touring server provides important enhancements to touring clients not yet available to today's Web browsers, including:

1. the touring server enables (browser-transparent) pre-fetching and integration over the visitation to Web objects from possibly different Web sites in a tour,
2. the touring server suggests temporal guidelines to the visitation order while making scheduling allowances for asynchronous user interactions,
3. the touring server creates a statistics gathering point to enable tracking of touring behavior across multiple touring clients,
4. the touring server acts as a control point to enable dynamic modification over the tour contents, and
5. the touring server enables the insertion of dynamically customized recommendations for individual touring clients based on statistics and profiles of touring clients.

SUMMARY

The present invention resolves the above problems by adding several new user-interface features to a Web browsing system, thereby obtaining unexpected and beneficial results. The invention introduces the notion of a dynamically customizable tour of Web sites with learning capability and online recommendation based on user profiling, aggregated trends, and previous touring interests.

The dynamic customizable tour mechanism can be used to facilitate customization in E-commerce. A carefully designed dynamic tour can collect valuable customer information. This is a far better way to collect customer information as compared to asking customers to fill out questionnaires and forms, or explicitly rating preferences on a group of items like CDs or videos. For example, consider an apparel store or boutique engaging in E-commerce. It can provide a tour on the latest fashion show. The show can consist of multiple segments including casual wear, work clothes, evening wear, sports clothes, etc. Each segment can be shown with a choice of different details/length and with different price points, styles, designers and color/pattern combinations. Based on how a customer navigates through the fashion show, the store can get a rough profiling of the customer. This information can be used to customize a subsequent Web page presentation to the customer. The customization can include target advertisement and promotion to the customers based on the observed preference. Another example can be a Web site of a computer store. It can provide a Web tour on the latest PC technology, with tour segments on desktops, laptops, processors, printers, storage devices, displays, etc. It can compose the processors pages from Intel and AMD Web sites, printers pages from HP, Cannon, and Epson Web sites, removable storage device pages from Iomega and SYQUEST Web sites, etc. By observing how this PC technology tour is received by a user, valuable information can be gained on what segment and price range of the technology or product is of most interest to this user.

The present invention is directed to a system, method and computer program product to display a dynamic customized Web tour of Web objects. The system provides tracking on the customer touring behavior on route selection and/or object browsed to provide guidance information on the remainder of the tour. A Web site can provide tours using the touring mechanism to collect customer information and create a customized E-commerce environment with tailored Web pages, promotion and advertisement.

In a preferred embodiment of the invention, the Web browser is split so that it is presented two (or more) Web objects at once. To start the tour, the user points his or her browser at "http://www. . . . /start.htm", where ". . . " is the URL address of the Touring Server Web site desired.

For example, a dynamic customized tour (DCT) can include an arbitrarily complex visitation pattern over objects on the World Wide Web (WWW or Web). According to the present invention, a tour server streams a tour to one or more touring clients. During a tour, users experience a customizable traversal view of the Web (referred to as a tour). A tour can span multiple sites and integrate Web content in ways not originally envisioned by site authors. Touring can be interactive. Touring clients can arbitrarily stop during a tour and independently engage on the exploration (hereinafter referred to as a side-tour) of the underlying Web site as well as any other Web site. Furthermore, side-tours can be tours themselves. Touring clients involved in a side-tour can, at any point in time, resume touring by returning to the last known touring stop.

A preferred embodiment is directed to a system, method and computer program product for providing dynamic customized tours on the Internet (herein referred to as tour) and in particular, a network-assisted way to interactively reproduce complex visitation patterns for traversal of the Web. The present invention includes features that allow the re-creation, sharing, and exploration of some target experience during the navigation and surfing of Internet content.

Given a dynamic collection of Web objects with pre-defined links, the present invention has yet other features for navigating a pre-composed guided tour over the collection of Web objects. The tour may traverse not necessarily directly-connected Web objects and may include arbitrary sequential and parallel traversals of these Web objects. Furthermore, the tour display may be synchronized over one or more windows, e.g., where the Web objects potentially could come from one or more sources (Web sites).

A touring server and a touring client can be used to deliver the touring experience to a user through a traditional Web browser. The tour is displayed on a Web browser. A streaming method is provided to multiplex Web objects from one or more sources into a single browser window through the dynamic creation of multiple browser frames or multiple browser windows. The streaming method automatically streams the traversal of such path from the touring server to the touring client so that any or many such touring clients will experience the same traversal paths.

In one embodiment, the presentation of Web objects across browser frames is subject to timing control. The present invention has features for ordering inter-object references in a tour sequence p wherein each ordered element e in p can be associated with a value t(e) (herein referred to as the presentation duration of e), and a token list K. The present invention has other features for automatically displaying a tour p (hereinafter referred to as touring) using a Web browser in a touring client by traversing an ordered sequence of inter-object references (i.e., URL(a,b) where (a, b) are in p) and holding the presentation of each Web object for a duration of time close to that of its corresponding presentation duration (t(e)). We refer to the ability to present a tour with approximate timing behavior as the integrity of the presentation of the tour at a touring client. The present invention has still other features for preserving the integrity of the presentation of the tour at the touring client even if the user of a Web browser on the touring client intervenes or interacts during the tour.

The present invention has still other features for specifying interactivity points as statistics collection points and introducing dynamic recommendations over the navigation. Anchor pages are inserted to allow customization of the tour. An anchor page (which can be considered an interactivity point in the Web context) can provide users with various tour options. This can include the number of Web objects included in the tour (short tour vs. long tour), the number of concurrent windows displayed during the tour. It can also include different functionality options such as with or without audio or video, the resolution of the video, with or without graphics, the resolution of the graphics, with or without frames on the Web pages, etc. Furthermore, the touring client is capable of interacting with the tour stream and allows VCR functionality such as fast forward, pause, and resume over the presentation of the tour. Such network-assisted tours can be interactive. A path composed of multiple branches and simultaneous traversal paths is synchronized in the navigating browser. Users are enabled to individualize their touring experience of a shared tour by allowing user-driven takeover and branching-off the streamed tour at any point during the traversal of such path. If a user decides to branch out of the tour element (herein referred to as a sidetrip), the retrieved Web object branched to span a new browser window and the current streaming of the tour (herein referred to as touring) will be temporarily paused. A touring history frame in the tour browser window provides a return pointer so as to allow the user to resume the tour (after such side-tour). The user is returned to the point in the tour from which the sidetrip began. The user touring behavior is tracked by the tour displaying system to provide guidance and customization on route or option selection and advertisement insertion or promotion for the remainder of the tour. By maintaining statistics on touring behavior, the system can identify the preferred selection of a group of users which has shown similar touring behavior patterns or route selections as the current user at any stage of the tour, and provide the proper guidance or information to the current user.

The foregoing, together with other features and advantages of the present invention, will become more apparent when referring to the following specification, claims and accompanying drawings.

BRIEF DESCRIPTION OF THE DRAWINGS

These and other objects, features and advantages will become apparent to those skilled in the art from the following detailed description and claims, with reference to the drawings wherein:

DETAILED DESCRIPTION

Given a computer programmed (hereinafter refer to as a Web client) having access to an open-ended collection (hereinafter referred to as the collection) of objects (hereinafter referred to as Web objects) in a data space (hereinafter referred to as the Web) on which selected pairs of these Web objects are connected by directed predefined inter-object references (hereinafter referred to as URLs), let G be a subset of such a directed graph having Web objects as its nodes and URLs as its edges and let the directed graph G span an arbitrary number of computer sites (hereinafter referred to as Web sites).

Figure 1:
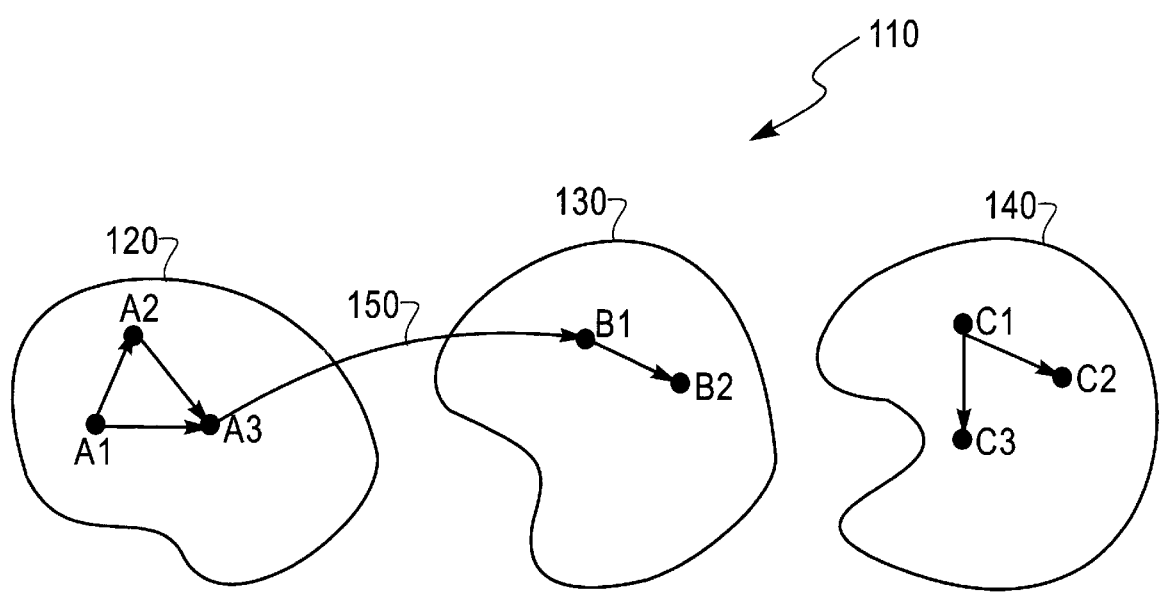
FIG. 1 illustrates a collection of Web objects distributed across several Web sites.

FIG. 1 depicts an example of such a graph G (110) including Web objects (A1, A2, A3), (B1, B2), and (C1, C2, C3) that are distributed across three Web sites (120 ... 140): URLs (i.e., directed links such as (150)) are predefined into this collection and used to link Web objects within and between Web sites.

Figure 2:
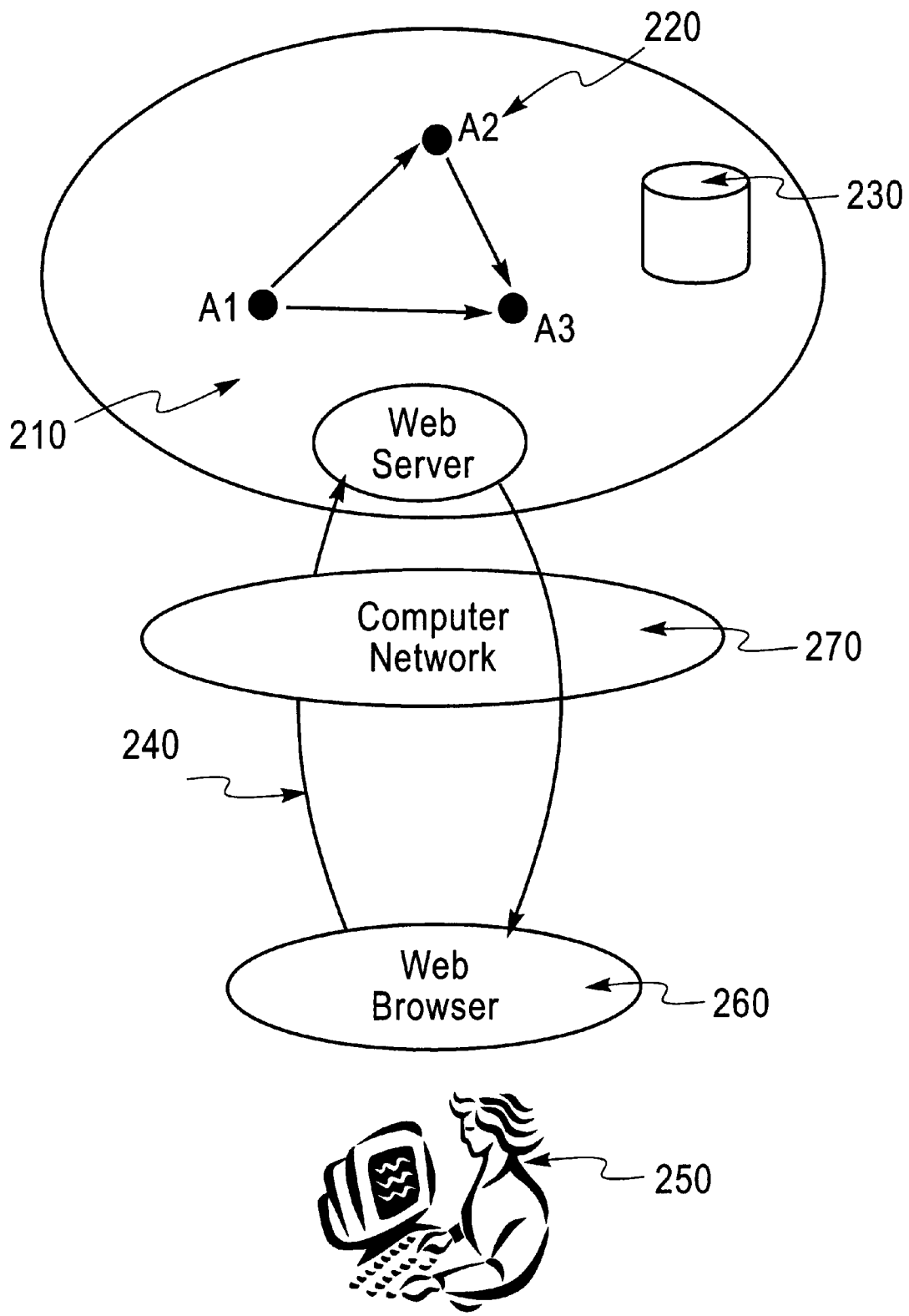
FIG. 2 shows an example of a traditional networked computing systems containing Web browser client and Web site servers.

FIG. 2 is a graphical depiction of a networked computing environment. The computer system is a conventional Web server (210) that stores and retrieves Web objects (220) (such as HTMLs) from disk storage (230), and transmits these Web objects (220) as a response to incoming HTTP requests (240). A user (250) accesses these Web objects (220) through a computer device (260) (such as a PC) connected to the Web server (210) through a network (270).

Let's assume there exists a way to span any arbitrary edge set over a directed graph G (such as collecting URL bookmarks) and let's refer to this edge set to as a traversal path p (hereinafter referred to as a tour) over G.

Figure 3:
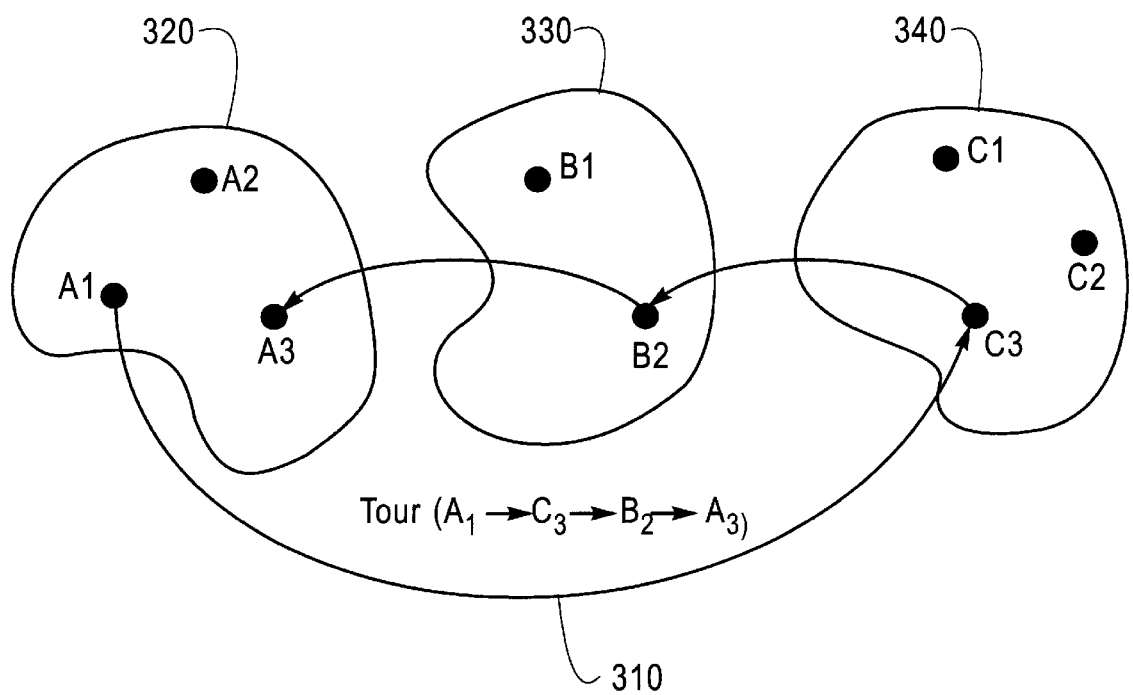
FIG. 3 shows an example of a tour spanning the collection of Web objects illustrated in FIG. 1.

FIG. 3 illustrates an example of a tour (310) that spans Web sites (320, 330, 340) (discussed previously with reference to FIG. 1). The tour may be composed of links not originally found (such as 320 and 330) in the original collection (110). Furthermore, the tour may traverse the collection in any arbitrary manner. For example, FIG. 3 shows the three Web sites (320, 330, 340) containing corresponding Web objects (A1, A2, A3), (B1, B2), and (C1, C2, C3) over which a tour p (310) is specified, including on the temporal ordering of Web objects (A1, C3, B2, A3).

Figure 4:
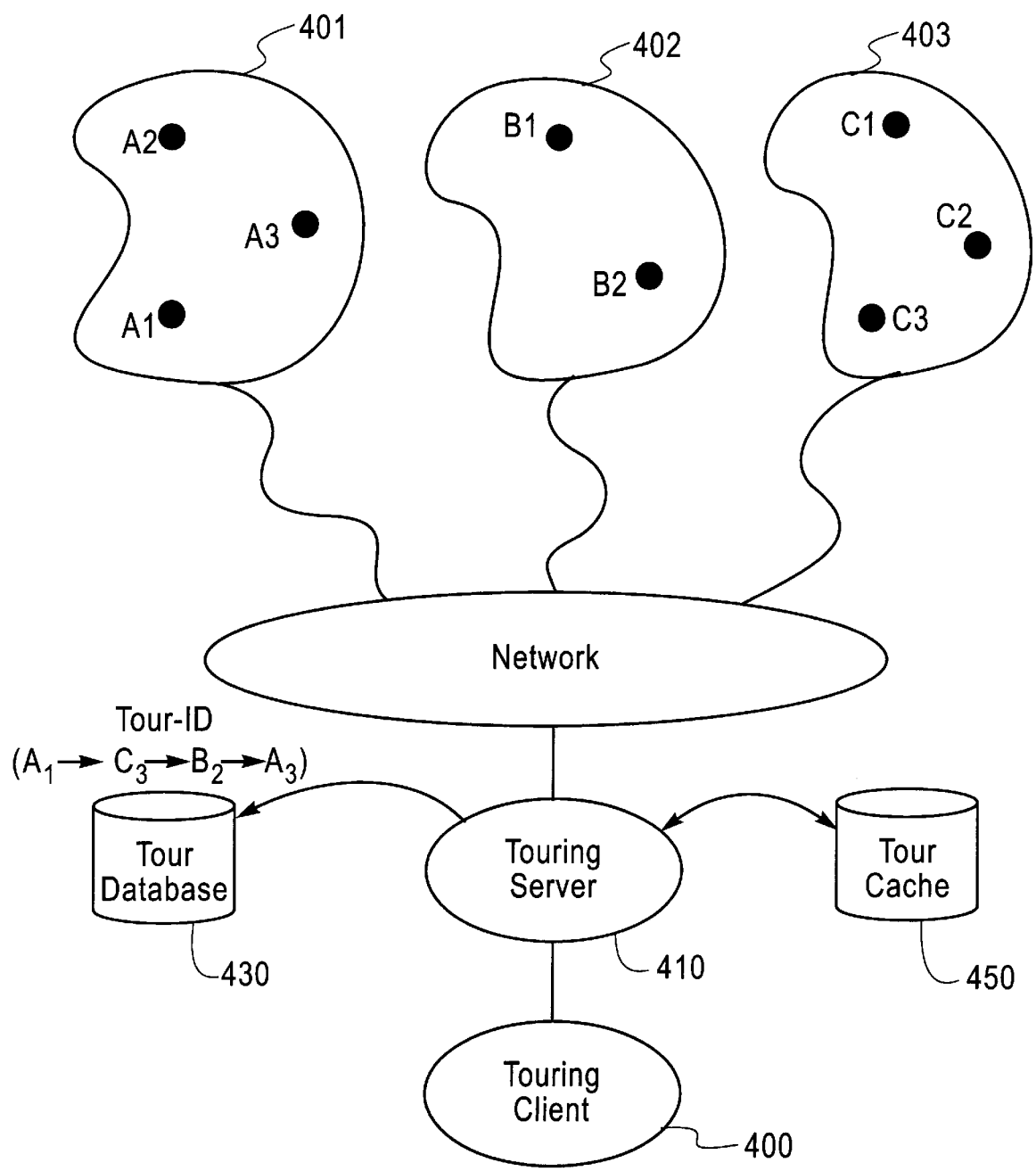
FIG. 4 shows an example of a networked computing system enhanced with touring client(s) and touring server for network-assisted navigation of the Web in accordance with the present invention.

FIG. 4 shows an example of a networked computing system enhanced with a touring client (400) and a touring server (410) for network-assisted navigation of the Web shown with respect to the distribution of Web objects (A1, A2, A3, B1, B2, C1, C2, C3) (such as Web object Al also in a tour (420)) that happens to be distributed across multiple Web sites (401, 402, 403). Note that the tour is not a property of the collection but an object by its own right. The tour is stored in a networked database (430) and referenced and retrieved by means of an unique identifier (440) such as a URL and referred to as a tour ID. The tour ID provides a reference to the start of the tour. In a preferred embodiment, users distribute and exchange tours by exchanging only this reference as opposed to exchanging and reproducing the underlying Web objects. A touring server (410) preferably maintains a tour's structure, pre-fetches objects into the tour cache (450) and streams Web objects in a tour to the touring client (400) for presentation. For example, assume there is an online catalog and its main directory is the first anchor. A user selects an object, say o1. This selection is then forwarded by the touring client to the touring server. The touring server can then fetches o1 and pre-fetches its immediate successors. Alternatively the entire tour and options can be pre-fetched at the start of the tour.

According to the present invention the touring server 410 allows a Web browser in a touring client to display a tour p in an automatic manner by traversing an ordered sequence of inter-object references (i.e., URL(a,b) where a, b are found in p) and holding the presentation of each such Web object for a duration of time close to that of its corresponding presentation duration while collecting and tracking the tokens of visited Web objects (discussed in more detail below). Furthermore, the integrity of the presentation of the tour observed by any such touring client, is preserved:

1. In the presence of intermissions (i.e., when the user of such touring client decides to interrupt the touring of p); and
2. Even if Web objects in the tour have ephemeral membership in the collection.

The intelligence to preserve the integrity of tours is preferably encapsulated in the touring server. Thus, touring clients do not need to be aware of the temporal nature of a tour (i.e., (1) nor affected by the absence of Web objects in a tour (i.e., 2) The touring experience of each individual touring client is a considered to be an interpretation of the tour tailored for a specific user.

Figure 5:
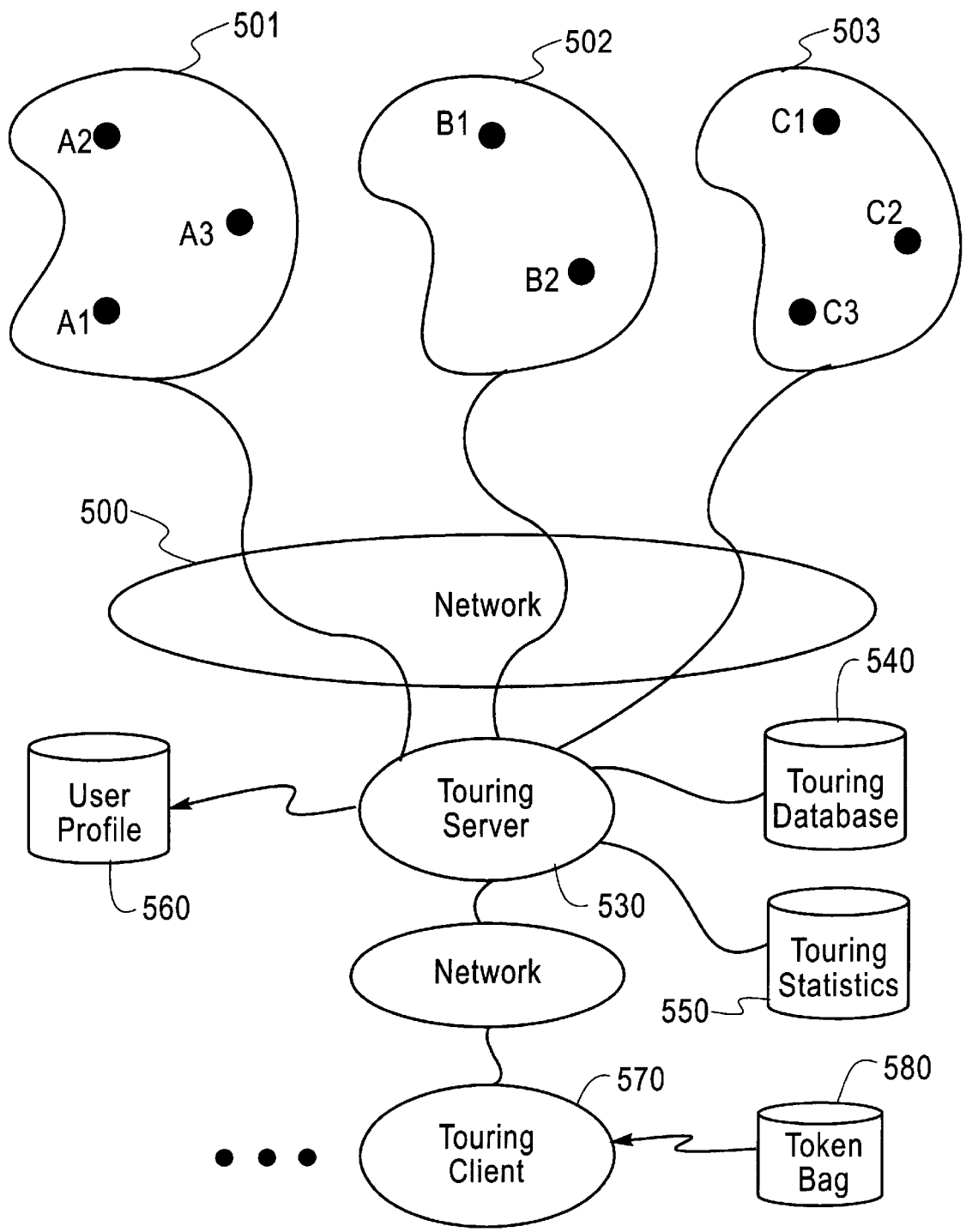
FIG. 5 shows a more detailed example of a networked computing system including multiple touring clients, a touring server, and multiple Web sites.

FIG. 5 shows an example of a more detailed model of the present invention involving a networked computing system (500) including multiple touring client(s) (510, 520), a touring server (530), and multiple Web sites (501, 502, 503). The touring server (530) has access to three databases: the touring database (540), which contains the various tours; the touring statistics database (550), which stores statistics about the various traversals of such tours; and the user profile database (560), which maintains touring profiles and associated token bags (580) for each of the touring client (570).

As will be discussed in more detail below, according to the present invention inter-object references can be ordered in a sequence, characterized in that each ordered element e in p is associated with a value t(e) (herein referred to as the presentation duration of e) and a token list K.

Figure 6:
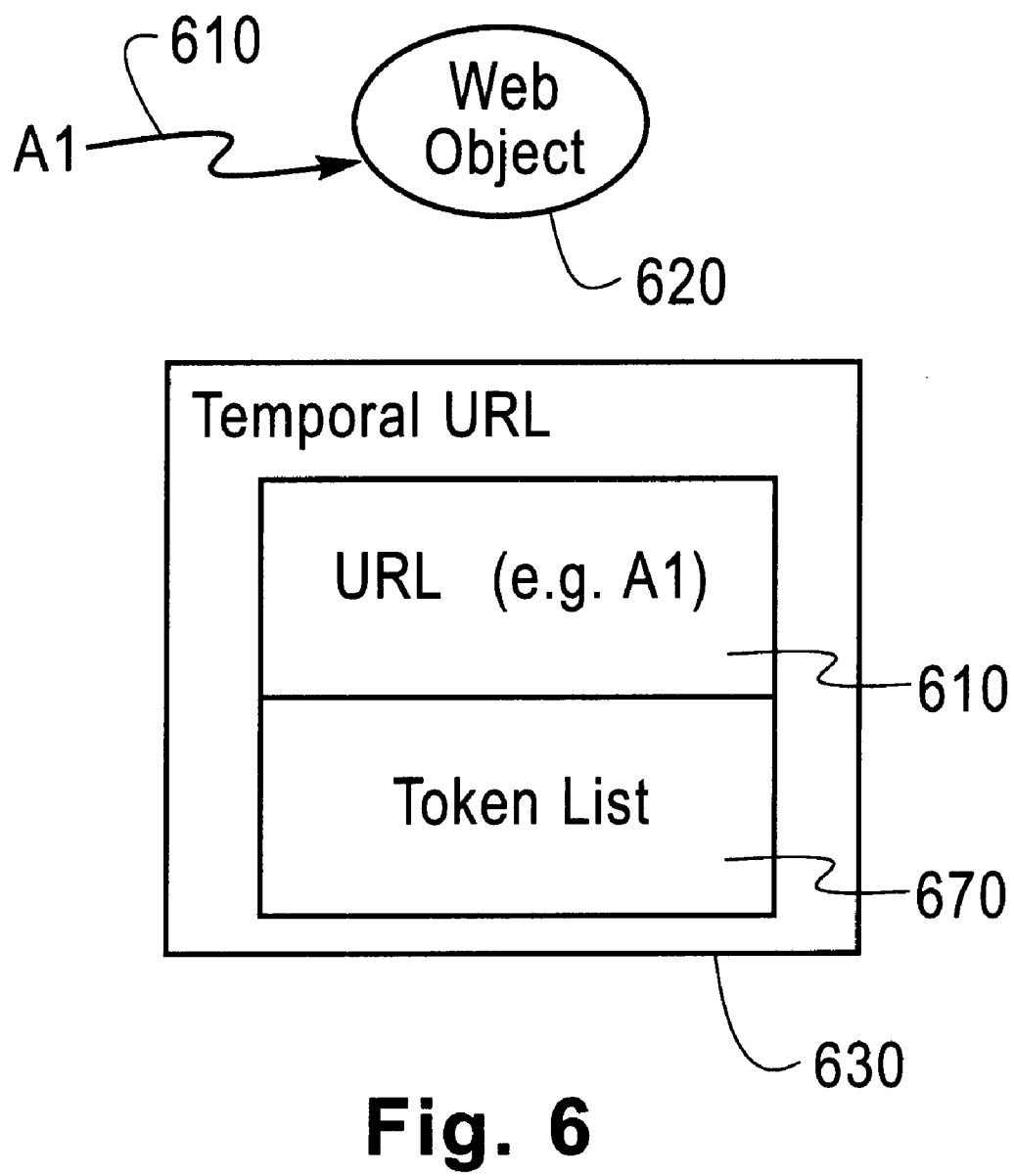
FIG. 6 shows an example of a data structure used to augment the URL of a Web object into a temporal URL as used by the touring server.

FIG. 6 shows an example of a data structure that can be used to transform the URL (610) of a Web object (620) into a temporal URL (630) as needed by the touring server of the present invention. A temporal URL is associated with each Web object. Each temporal URL object (630) includes a copy of the original URL (610) pointing to by the true location of a Web object (620), and the list of keywords (herein referred to as tokens (670)) associated with this Web object (620).

It should be obvious to one skilled in the art that whether the set of tokens associated with a Web object is dynamically generated on the fly through a data mining technique or statically associated with a Web object is an implementation issue. Furthermore, it should be obvious to one skilled in the art that, for efficiency with respect to overheads, the URL can be associated with a time stamp so as to allow the caching of Web objects such as HTMLs.

Figure 7:
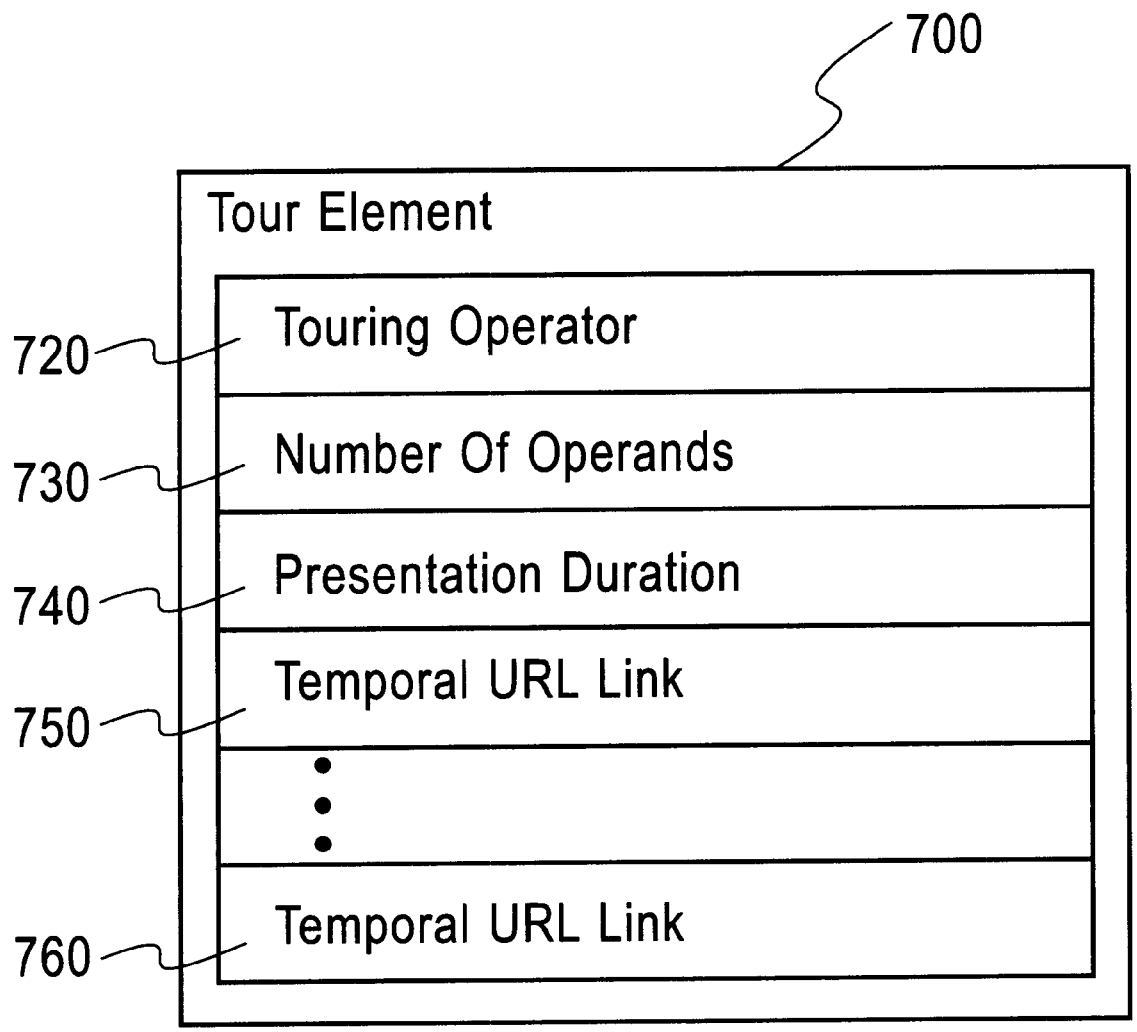
FIG. 7 shows an example of a data structure used to represent a tour element.

FIG. 7 shows an example of a data structure used to represent a tour element (700). Each tour element (700) can include several fields: the touring operation type of the touring element (720); the number of temporal URLs (730); the presentation time of the touring element (740), (in the preferred embodiment, if this field is zero, it means that user input is expected as in the case of a touring anchor); and a list of one or more temporal URLs (750 and 760).

Figure 8:
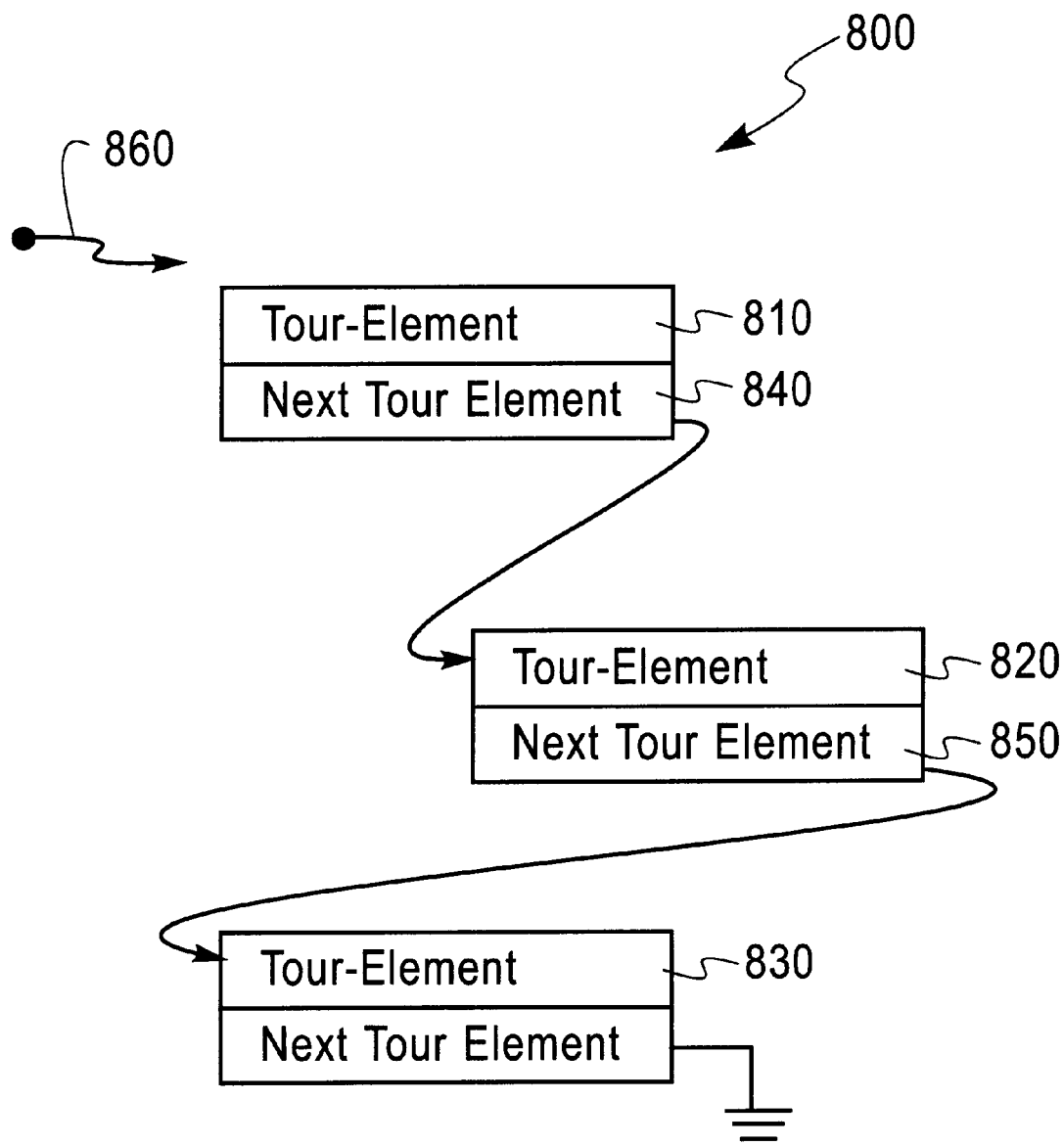
FIG. 8 shows an example of a data structure and specification used to represent a sequential tour.

FIG. 8 shows an example of a data structure to represent a tour. Each tour (800) can be represented as a linked list of touring elements (810, 820, 830). The ordering between tour elements is sequential and specified by links (840, 850). A tour id (860) points to the start of the tour.

Figure 9:
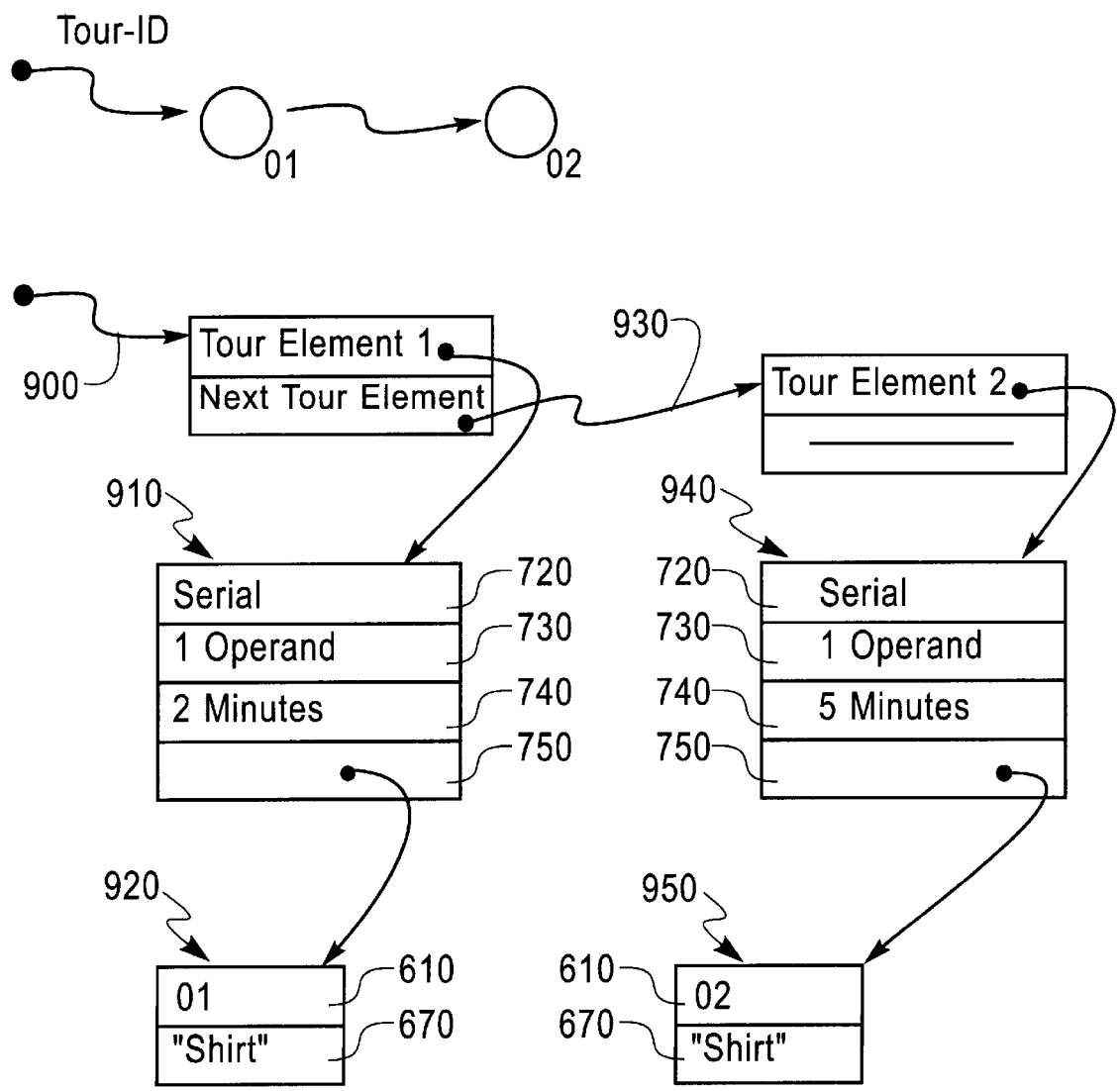
FIG. 9 shows an example of a data structure to representation a tour.

FIG. 9 depicts an example application of the data structures to support the representation of a simple sequential tour. A tour ID (900) points to a starting tour element (910), the touring element contains a reference to a temporal URL (920) for some Web object that has a presentation duration (740) of 2 minutes and associated with a token (670) "shirt." A link (930) to a next tour element (940) is also part of the touring element (910). This touring element, in turn contains a reference to another temporal URL (950). This URL (950) is associated with a token (670) "shoes" and has an expected presentation duration (740) of 5 minutes. The tour includes two Web objects and preferably graphically shows the user shirts and shoes. One aspect of this invention dynamically customizes the presentation of subsequent touring elements based on feedback obtained by (possibly implicit) methods such as the gathering of statistics and (explicit) methods such as a user profile. For example, feedback could be used to generate a recommendation for matching "shoes" to "shirts".

Now consider an example of a tour p that may not be just a sequence of URLs but perhaps some arbitrarily complex sequence of URLs. For example, a tour for which one sub-sequence may require a sequential presentation of various URLs (hereinafter referred to as a serial sequence) whereas other sub sequences may require a simultaneous presentation of various of these URLs (hereinafter referred to as a parallel sequence). A tour p could further be composed of any arbitrary combination of such serial and/or parallel sequences; and some of these parallel sequences could be traversed as an option; and furthermore, these sequences could be arbitrarily nested. For example, a tour p could be composed by concatenating any two such traversal paths p_1 and p_2 into a serialized traversal path represented by p=p_1 followed-by p_2 or we could overlap any two such traversal paths into an parallel traversal path represented by p=p_1 overlapped-by p_2.

The present invention has features which enable the display on a Web browser associated with a touring client, the traversal of any such tour p, including: displaying serial sequences of temporal URLs (such as concatenating the presentation of two touring sequences p1 and p2); displaying parallel sequences of temporal URLs (such as simultaneously overlapping the presentation of two touring sequences p1 and p2); enabling user-selection of alternative sequences of temporal URLs (such as choosing between two disjoint touring sequences p1 and p2 as alternatives); enabling/disabling optional sequences of temporal URLs (such as overlapping the presentation of a touring sequence p1 by some optional touring sequence p2 such as audio or video commentary); displaying dynamically inserted sequences of temporal URLs over a tour (such as advertisements); and arbitrary combinations of the above sequences.

In a preferred embodiment, these features are specified through the tour element (700) and the various touring operators (720) possible.

Figure 10:
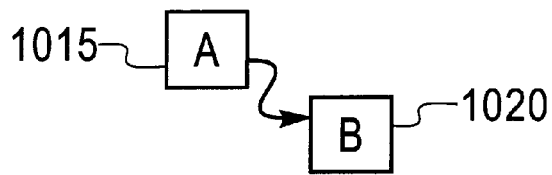
FIG. 10 shows an example of a specification and representation of various touring operators.
Figure 10:
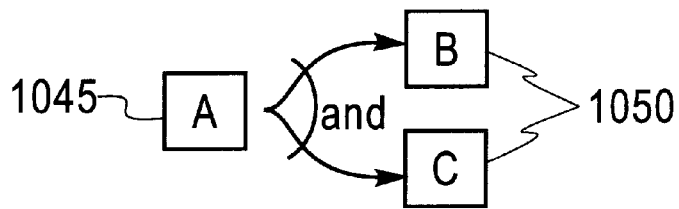
Figure 10:
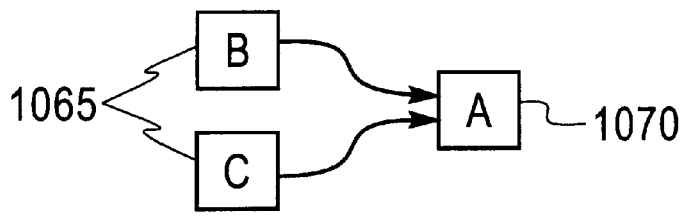
Figure 10:
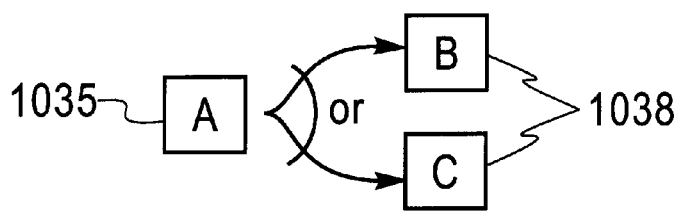
Figure 10:
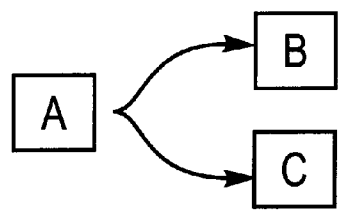

FIG. 10 shows an example of a specification and representation of the various touring operators. As depicted, there are four touring operations for the creation of a dynamically customized Web tour (DCT). A 'touring sequence' represents serial visitation of touring elements and it is specified by the touring sequence operation (A->B) (1010). The net effect is that the browser displays first the tour element A (1015) and then replaces A with tour element B (1020). A 'touring anchor' is a touring element used to present a decision point 1035 among multiple possible paths (e.g., B or C) (1038). This scenario causes an interaction with the user and it is represented by the touring sequence A->(B+C) (1030). A 'touring fork' represents a transition from a sequential tour to a parallel tour. The touring fork (A->B*C) (1040) causes the touring client to display multiple frames, one per fork alternative (B*C). For example, for this touring fork whereas the display of the Web object A (1045) was presented in a single frame, as a consequence of the touring fork, the touring browser allocates two frames for the synchronous presentation of Web objects B*C (1050). A 'touring meet' represents a transition from a parallel tour to sequential tour. The touring meet (B*C->A) (1060) causes the touring client to merge multiple frames, one per fork alternative (B, C) (1065) into a single frame (1070). As a result of the touring meet, the touring browser closes all but one of the frames used for B & C and uses such frame for the presentation of Web object A. A 'touring option' allows the user to choose between a basic touring sequence (1010) or a content augmented touring sequence (such as an audio commentary), for example (A->B+B*C) (1080).

Those skilled in the art will appreciate that the touring anchor and touring option operators can be used by a tour author to provide touring alternatives (of possibly different length and) of different functionality including but not limited to the augmentation of the original tour content with or without audio and/or video commentary, with or without frames, with or without graphics. Furthermore, the touring anchor can provide a data collection point on which user input will be collected and forwarded to the touring server to determine a suitable way of fitting the presentation to the browser and touring client capabilities, including but not limited to device characteristics such as video processing capabilities, video resolution and graphics resolution.

Those skilled in the art will also appreciate that a touring breakpoint operator can be used by tour authors to specify to the touring server a place within the tour for the dynamic insertion of content, such as an advertisement. In a preferred embodiment, the touring breakpoint communicates a message "Insert Ad Here" to the touring server. The touring breakpoint can be represented as a touring sequence containing a touring element with nil temporal URL(s). The dynamically inserted content (e.g., an advertisement) may be a touring sequence itself In such cases, the touring breakpoint can be considered as a sidetrip operator, allowing one to enter a seditious from a current tour and once completed, return to a well defined point inside an originating tour.

In a preferred embodiment, the display of multiple URLs is presented through multiple frames. The same could be done for displaying these URLs across multiple windows. Since the presentation duration (740) is associated with the touring element (700) and not the temporal URL (630), the present invention allows simultaneous traversal of parallel touring sequences by properly authoring the corresponding temporal URLs to contain the necessary concurrent temporal URLs. Furthermore, the touring element method allows the user of a touring client to takeover the whole coordinated navigational space spanned by the playback of these concurrent temporal URLs. The number of concurrent temporal URLs may vary between successive touring elements. In a preferred embodiment, this decision may be based on a viewer preference or route selection. Last, interaction with any of the Web browser frames will cause the streaming of subsequent temporal elements to be paused.

An example implementation of a tour in a Web browser, in accordance with the present invention will now be described in further detail.

Figure 11:
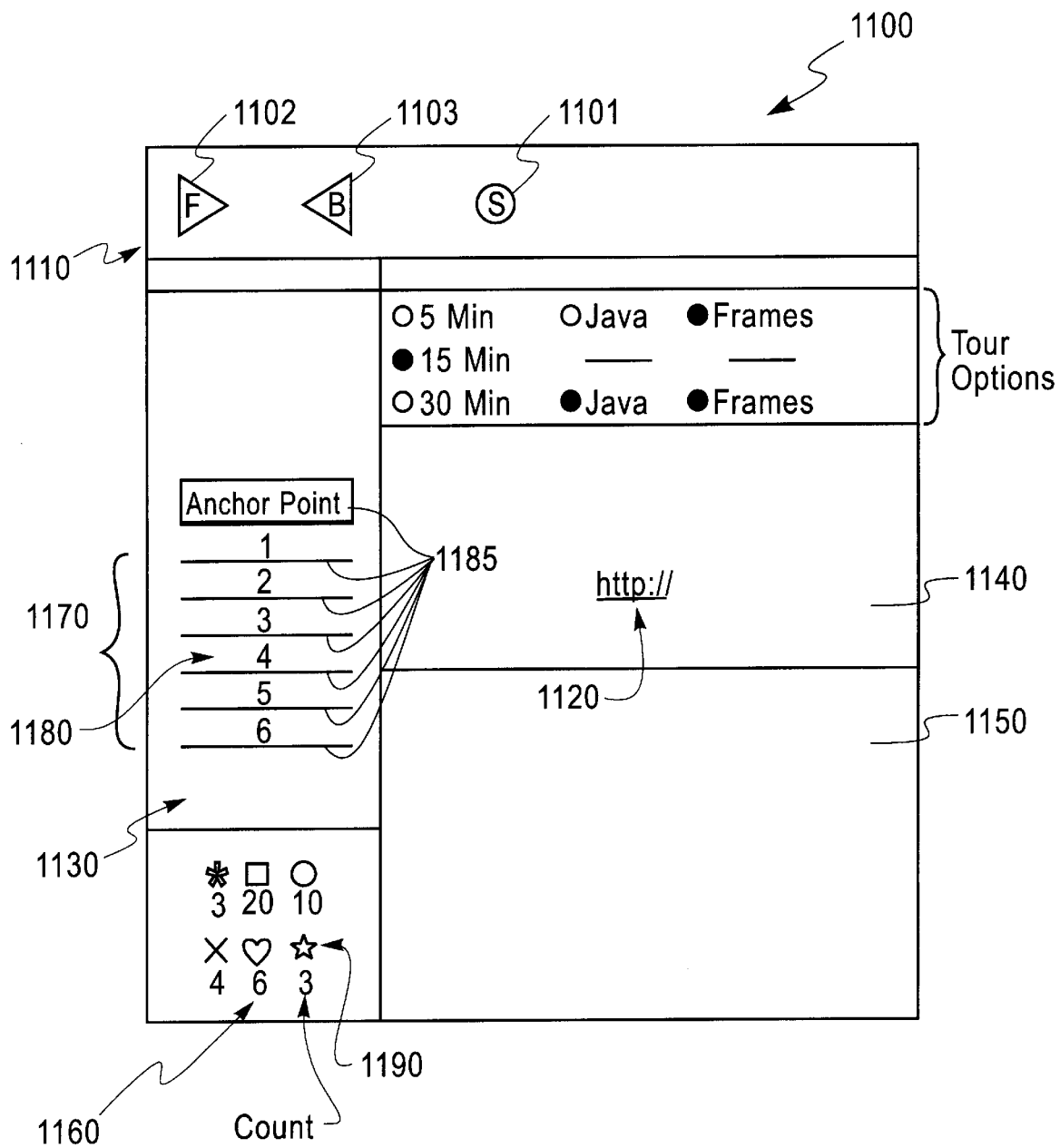
FIG. 11 illustrates an example of a view of the Web browser when used for touring the Web through a touring client.

FIG. 11 depicts an example of a view of a Web browser (1100) when used for touring the Web through a touring client (400, 570). In a preferred embodiment, the browser's standard controls (1110) are adapted by conventional means to take over the tour. For example, interacting with any of the 'back' and 'forward' controls causes the tour to be paused; since the timing information is kept at the touring server, the touring client requests the touring server for a pause. Similarly, clicking on a link (1120) causes the tour to pause; however, in this case a detour is initiated. If the link happens to be the URL of another tour, then a 'side tour' is initiated. The past touring history (in terms of tours and side tours) is shown in the tour history window (1130). In a preferred embodiment, multiple frames (1140, 1150) are used to depict parallel visitation branches in the tour. The browser controls (1110) can also deliver VCR interactivity over the Web tour (discussed in more detail with reference to FIGS. 15 and 16). The history and status of the tour is displayed in an additional frame referred to as the tour history (1130). A token bag window (1160) displays the tokens (1190) acquired during the touring session. A tour map window (1170) can map the current traversal (1180) over the thus far discovered touring space associated with this user.

Figure 12:
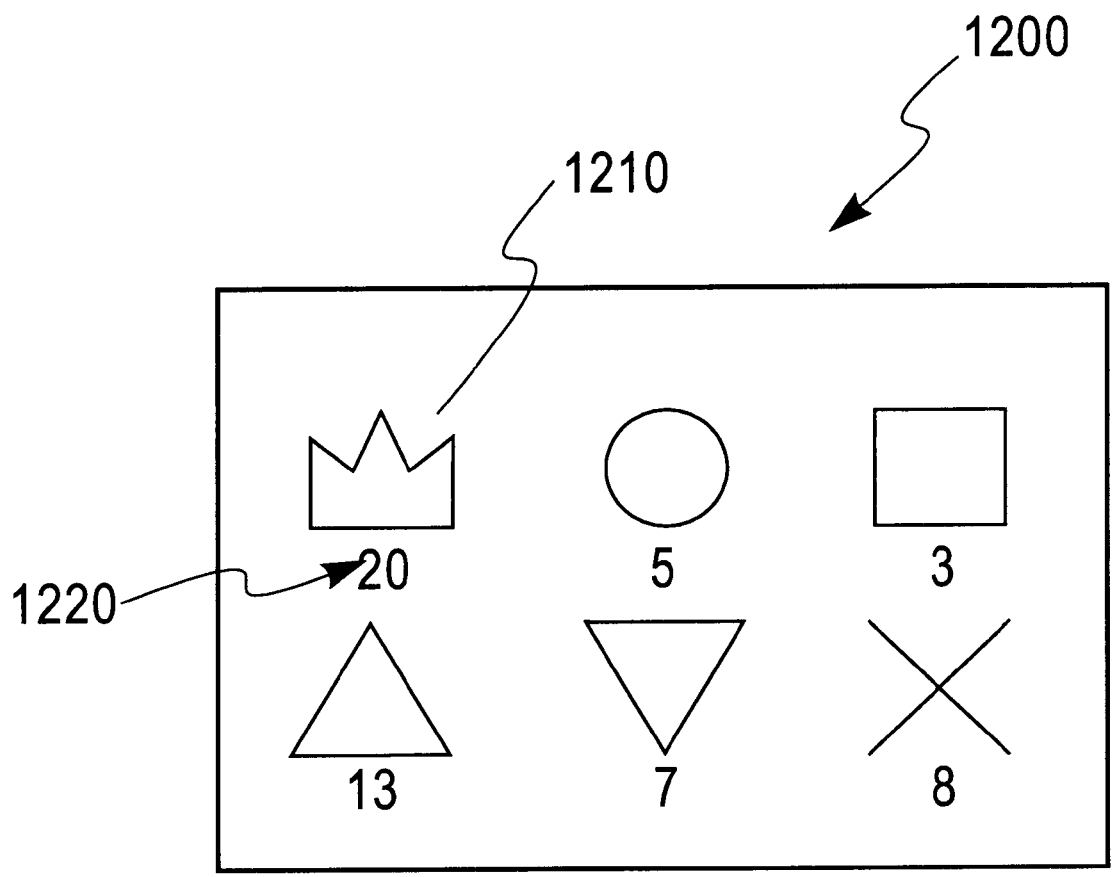
FIG. 12 shows an example of a token bag (and its contents) for a touring client.

FIG. 12 illustrates an example of a token bag (1200) (and its contents) for a touring client. The traversal of a tour captures tokens from each visited tour element into the users token bag. The token bag (1200) associated with a touring client contains tokens collected by this user during its traversal over one or more tours. On each visit to Web tour element, the touring server updates the token bag associated with a touring client. The updated token bag is forwarded to the touring client and presented to the user through its browser. Since tokens are automatically collected, users should preferably have control over the membership of tokens in a bag. In a preferred embodiment, the token bag (1200) shows for each token, an icon (1210) and a count (1220). The count (1220) can be used to provide feedback to the user on a relative weighting of an individual token. Those skilled in the art will appreciate that in addition to enabling tokens, a temporal URL could also specify disabling tokens (1230).

Thus, user's can interactively modify a token bag to custom-tailor the dynamic recommendation system that guides the touring experience of a user. For example, while shopping for cars, a user may acquire tokens for "conv", "BMW", and "5-speed". However, if "conv" does not properly describe the user, the user may like to reduce the impact of such token over its touring experience. In one embodiment, the user may: drop or remove touring tokens; enable or disable (1230) tokens; modify their weights; or even modify their order. To one skilled in the art, it is obvious that the order of touring tokens may be used to imply user preferences. Upon a change to the token bag (1200), the touring client (570) sends its changes to the touring server (530). The touring server (530) uses the changes to update the user's token bag and influence a dynamic recommendation engine (discussed in detail with reference to FIG. 18).

Figure 13A:
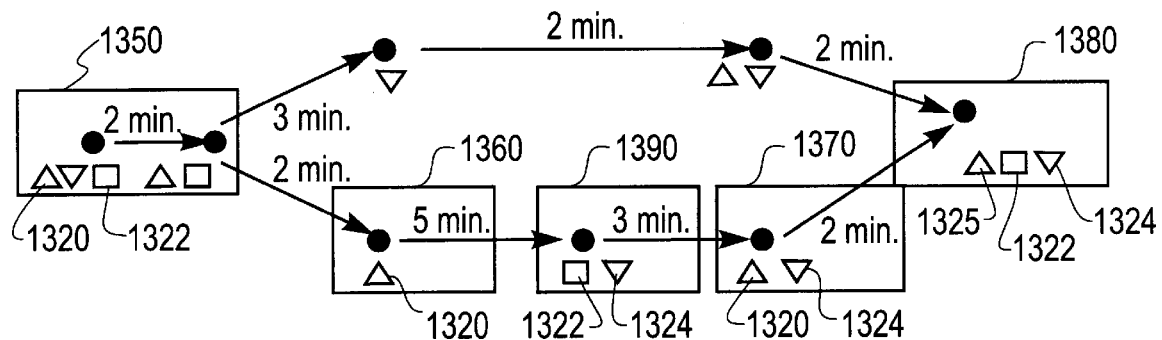
FIGS. 13a–b illustrates examples of various possible views over a dynamically customizable tour composed of web objects tagged by tokens.
Figure 13B:
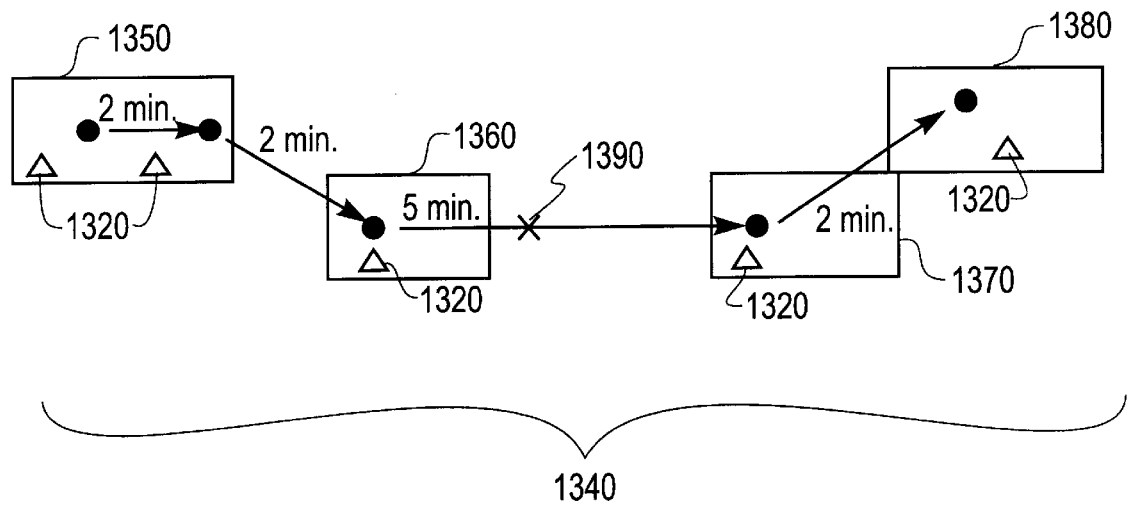

FIGS. 13a and 13b illustrate an example visualization of a dynamically customizable tour composed of token-enabled web objects. As depicted, each temporal URL (1360–1380) has one or more associated tokens (1320–1324). For a given token type the tour (1340) can be dynamically customized. As depicted in FIG. 13b, the resulting dynamically customized tour has a different time length than the original tour since some tour elements (such as 1390), not matching the original token bag (1330), were omitted from the tour. Only those tour elements (1350, 1360, 1370, 1380) having membership in the token (1330) bag are streamed to the touring client. Thus, one form of dynamic customization of a tour can be to stream only those temporal URLs (630) having membership (i.e., having a matching token) in a user's token bag. In such case, only those temporal URLs and their corresponding Web objects will be streamed to the touring client whereas Web objects having negligible (or no) membership in the user's token bag will then be omitted from the tour offered by the touring server to this touring client. As a consequence, the resulting touring experience (referred to as a navigation pattern) may traverse or include a subset of the routing decisions. Those skilled in the art will appreciate that the touring server could rely on a conventional database query engine to dynamically customize a view over a given tour based on timing and token membership requirements. Further, that it may be desirable to provide some feedback (such as planholders and associated tokens) to the user indicating the magnitude or impact of the dynamic customization over his or her touring experience.

One skilled in the art will also appreciate that the touring server could use the token membership mechanisms to offer guidance or feedback to its touring clients. For example, at various intermissions during a tour, the touring server may determine to offer and/or sell tokens to touring clients needed for routing decisions found to be of interest to like-minded users, but currently being missed by this touring client because of the contents of its token bag. Furthermore, the feedback can graphically represent the impact of a dynamic adaptation to a remainder of the tour. For example, the sustem could "grey out" in the tour history map a dynamically omitted tour element, or graphically depicted a change as shown in FIGS. 13a–b or various equivalents or alternatives.

Figure 14:
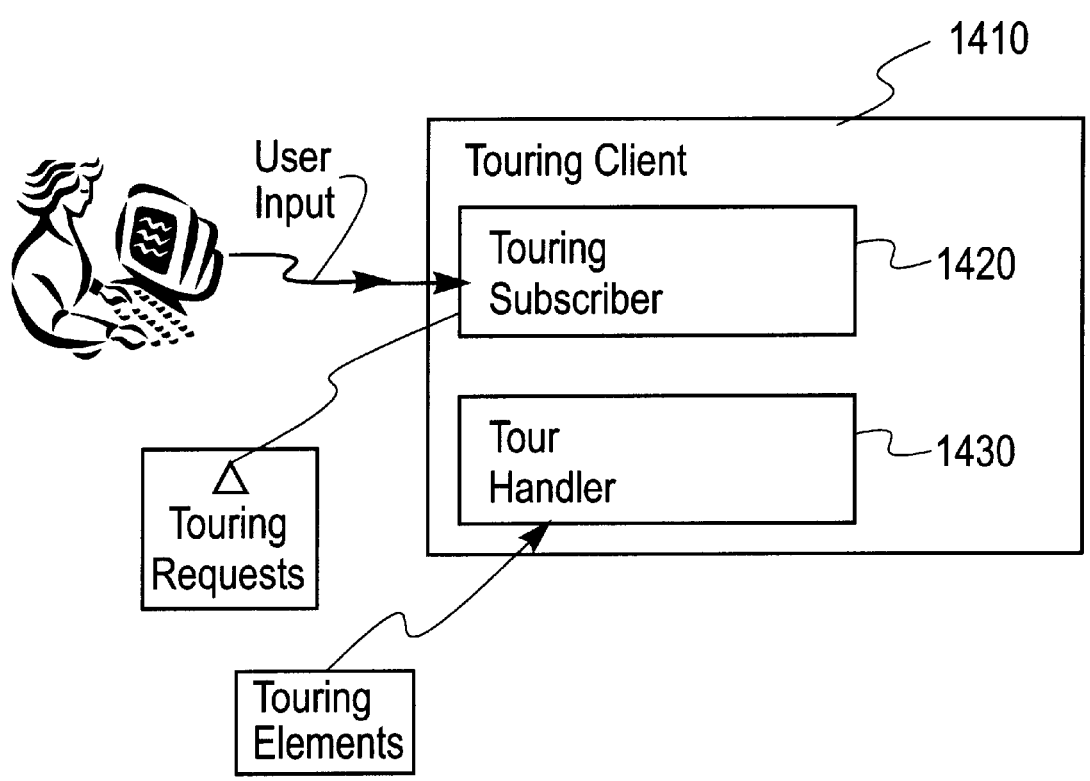
FIG. 14 shows an example of building blocks or components of the touring client.

FIG. 14 shows an example of the building blocks or components of a touring client. As depicted, the touring client (1410) includes a touring subscriber (1420) and a client tour handler (1430) (discussed in more detail with reference to FIG. 16). The touring subscriber (1420) presents and collects tour choices from the user (such as a museum tour or a explore-the-city tour) whereas the client tour handler (1430) receives and displays tour elements as well as their tokens from the selected tour, for example on a browser window (discussed in more detail with reference to FIG. 11) of the touring client (1410).

Figure 15:
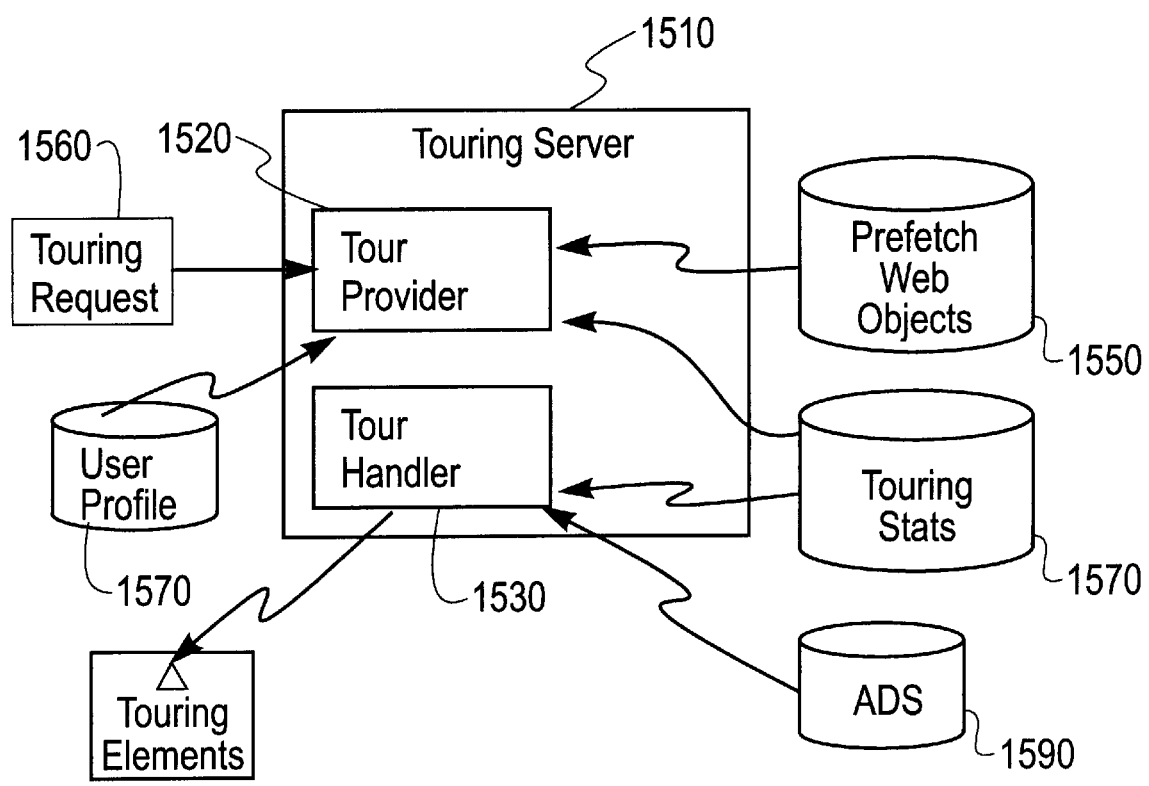
FIG. 15 shows an example of the building blocks or components of the touring server.

FIG. 15 shows an example of a touring server architecture having features of the present invention. As depicted, the touring server (1510) includes a tour provider (1520) and a server tour handler (1530) (discussed in more detail with reference to FIG. 17). The touring provider receives and processes touring requests from touring clients. As part of this processing, the touring provider pre-fetches Web objects (1550), initializes user profiles (1560), and loads touring statistics (1570) for the requested tour (1560) and an associated user profile (1570). The server tour handler (1530) evaluates and updates token bags, to then fetch, integrate, and stream such token-enabled temporal URLs (1550) into touring elements to the touring client (1410) for presentation. As part of the processing of touring elements, the server tour handler may receive and process user-driven feedback (1580) (such as a pathing decision from a touring anchors or a VCR-like browser control request) as well as introduce advertisements (1590).

Figure 16:
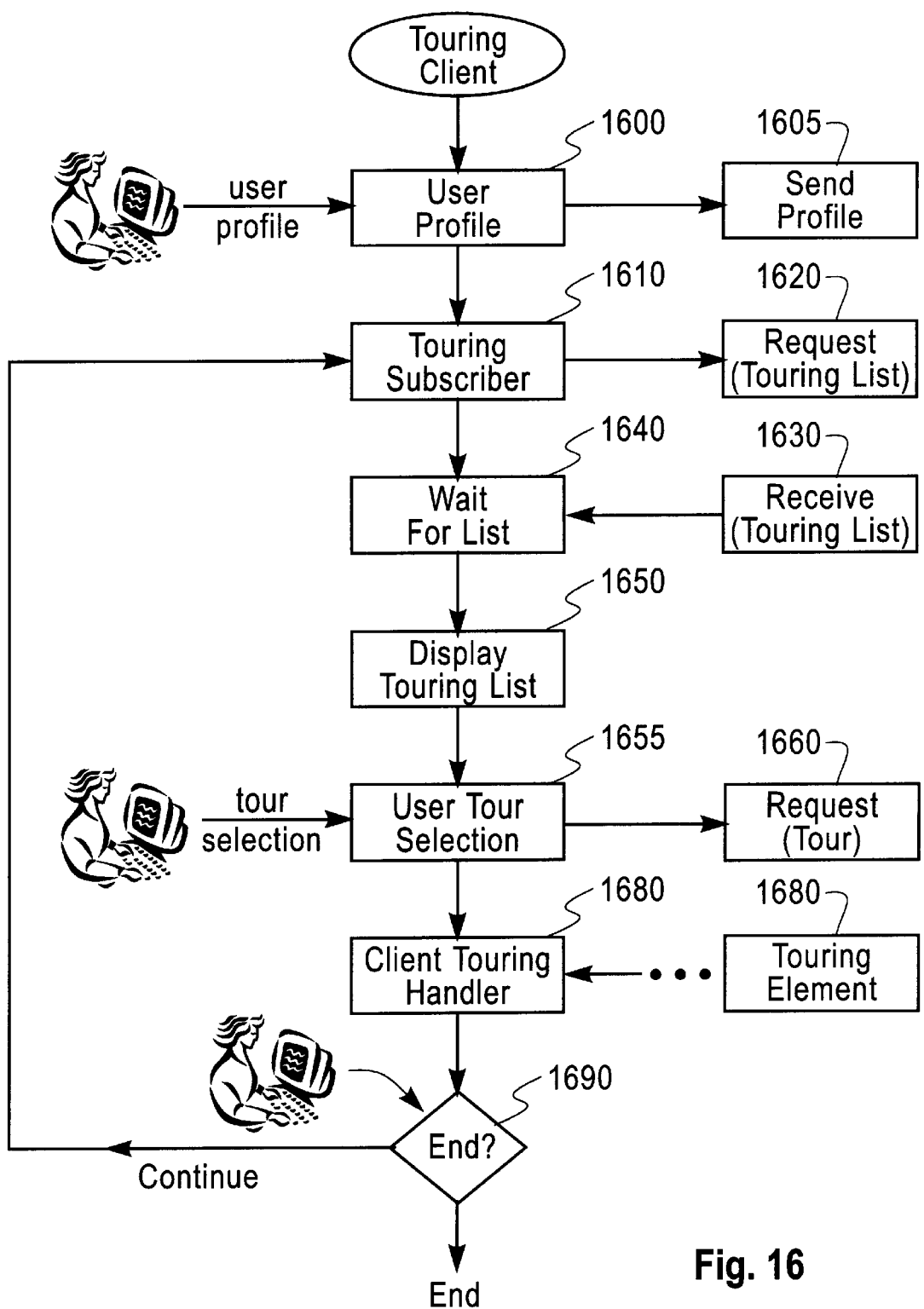
FIG. 16 shows an example of a method for a touring client to make touring requests to the touring server.

FIG. 16 shows an example of a method for a touring client for placing touring requests to the touring server. Prior to (or even) during the tour, the user may complete and provide a user profile questionnaire (in step 1600) about his or her preferences, e.g., using conventional web-based "forms." The profile information (in step 1605) is forwarded to the touring server for analysis and storage. To start its tour, a client invokes its tour subscriber (in step 1610) which attempts to retrieve the list of the available tours (in step 1620) from the touring server. The touring client waits for and receives a response (in step 1640) from the touring server containing the list of available tours (in step 1630) and displays the list (in step 1650) to the user. The user then selects a tour from this list (in step 1655) and then a touring request (in step 1660) is sent to the touring server. The touring client then waits (in step 1680) for the streaming of touring elements (in step 1680) from the touring server. The client touring is driven by these touring elements (in step 1680) from the touring server which are processed by the client touring handler (in step 1680) (discussed in more detail with reference to FIG. 18). Normally, the touring handler of the client waits for the end of the tour (in step 1690) and prompts the user whether to continue to request another tour (in step 1610) or terminate (in step 1690) the touring experience.

Figure 17:
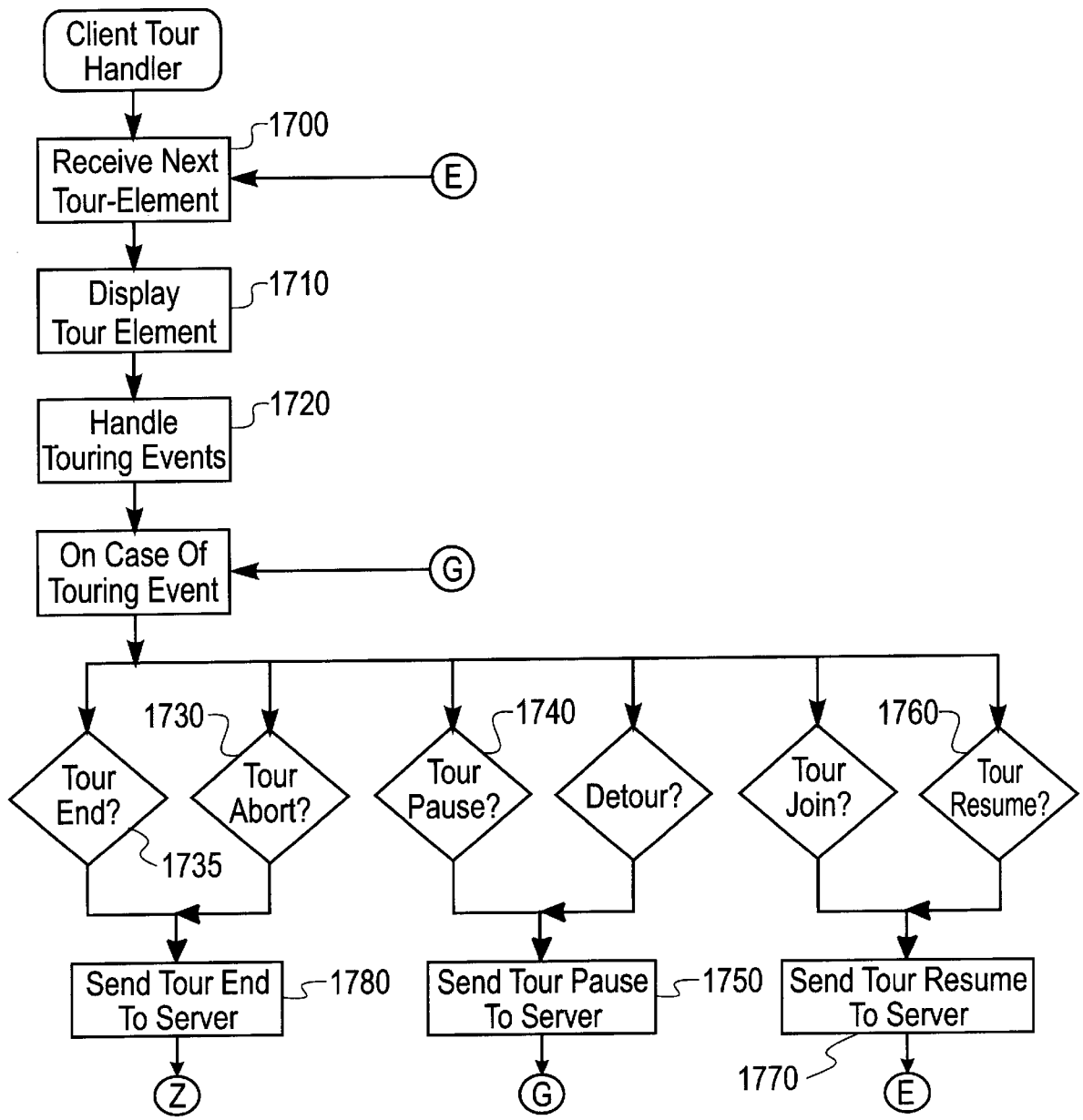
FIG. 17 shows an example of a method for a touring server to handle the touring requests of a touring client.

FIG. 17 shows an example of processing steps performed by the tour handler (1430) (also called touring handler) of a touring client in the presentation of touring elements (FIG. 8). The touring client first waits until it receives the next touring element (in step 1700). Note that in the preferred embodiment, this wait time represents the presentation duration of the previous touring element and was enforced by the touring server. Furthermore, in the preferred embodiment, this time can be scaled down so as to implement a "fast forward" over the tour. Once the touring element is received, the touring client displays the touring element on the browser (in step 1710). Note that in the preferred embodiment, the touring server dynamically maps each touring element data structure to an HTML page containing a frame for each of its temporal URLs (630). The touring client now waits for touring interactivity events (in step 1720), if any. These events are generated by the user of the touring client as an interaction over the touring. There are several possible cases. The user may want to abort the touring (in step 1730), in which case a TourEnd request (in step 1780) is sent to the touring server. The user may instead want to pause the touring (in step 1740), in which case a TourPause request (in step 1750) is sent to the touring server. After pausing a tour, the user may want to resume touring (in step 1760), in which case a TourResume request (in step 1770) is sent to the touring server.

Figure 19:
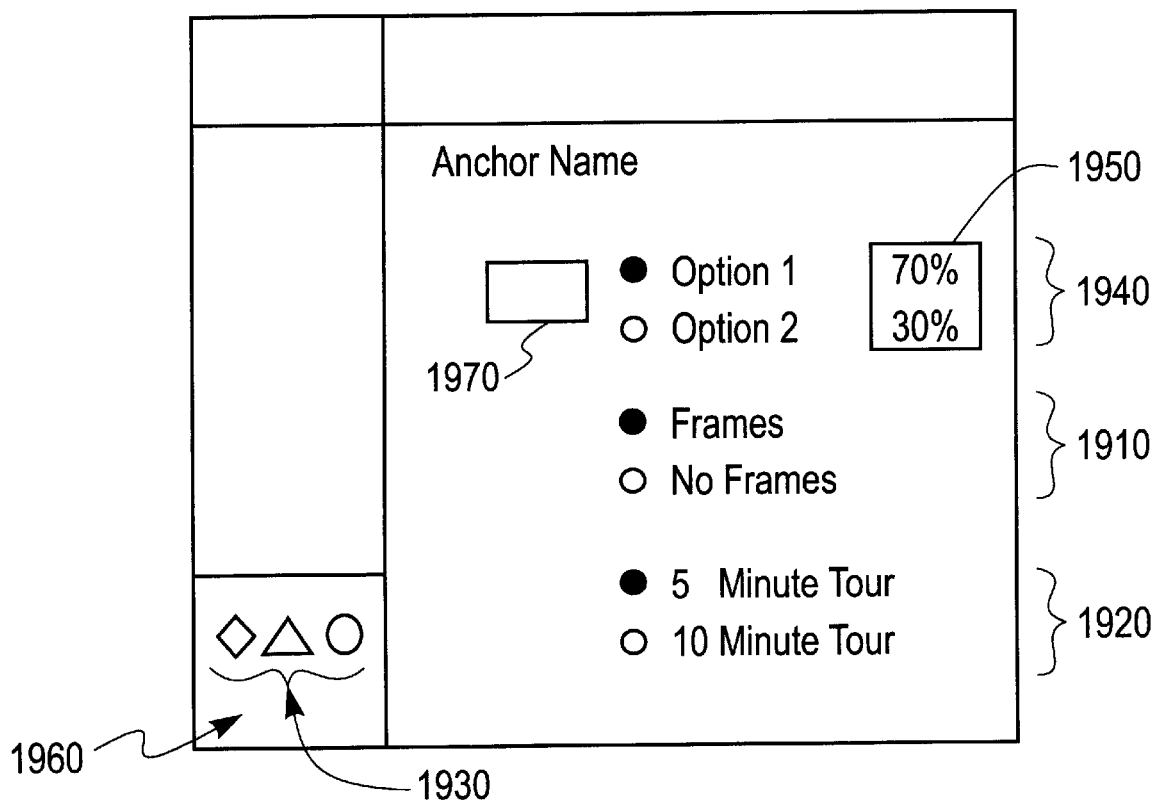
FIG. 19 illustrates an example of an anchor page as presented by the touring client.

In the preferred embodiment, a pause on the tour corresponds to clicking either a browser control such as "Back" (1103), or "Stop" (1101) as well as clicking on a URL link (1120) within any of the touring windows (FIG. 11). Furthermore, clicking on the "Forward" (1102) browser control will cause a transition to the next touring element. This represents another way of implementing a simpler fast forward over the touring. Preferably, by clicking on a link for any past (or future) touring element (1185) listed in the tour history window (1130) a request to jump to the respective touring element will take place. Lastly, some touring elements require user input such as in the case of the touring anchor (FIG. 19). In a preferred embodiment, the touring server does not run a timer for such touring elements but rather waits for a response from the user. The response provided will be forwarded to the touring server for processing. In our preferred embodiment, the touring server collects statistics (describe in further detail with reference to FIGS. 21 and 22) to analyze the response and dynamically customize the remaining tour experience of this user.

In a preferred embodiment, the user may click on any link found in any Web object embedded within a tour element (700). Clicking on the link will pause the current tour (i.e., stopping the presentation timer and sending a TourPause message (step 1750) to the touring server). The touring client will then open a new browser window for the presentation of this link and its associated Web object. In the event that the link represents a tour itself, the tour will be initiated on the new window. Pressing the forward button on the original touring window will cause the pause tour to resume by presenting the current touring element again and sending a TourResume message (step 1770) to the touring server associated with this tour. Preferably, both windows tour simultaneously and tours can be streamed by independent touring servers.

Figure 18:
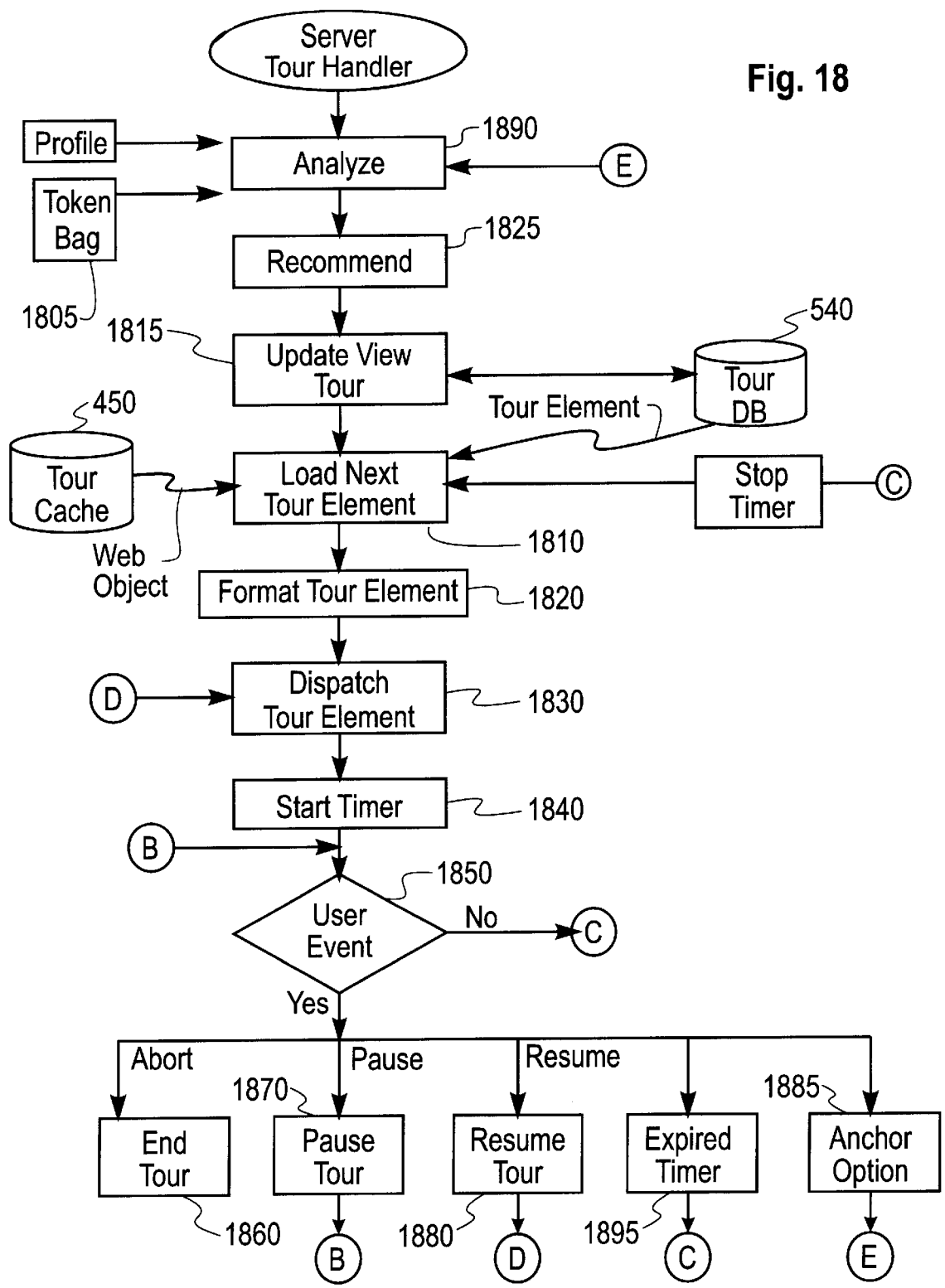
FIG. 18 shows an example of a method for a touring server to prepare a tour for a client.

FIG. 18 shows an example of the processing steps performed by the touring handler of a touring server for the streaming of tour elements (700) to a touring client. The touring server waits (in step 1800) until a timer associated with the presentation duration (740) for the current touring element expires. Once the expiration is detected, the touring server fetches the next touring element (in step 1810). Note that in the preferred embodiment, the touring server prefetches touring elements and that a single touring element may contain multiple temporal URLs (750 . . . 760). Once all the temporal URLs on a touring element are fetched, the touring server dynamically maps these various Web objects into a single HTML page containing a frame (1140, 1150) for each of its Web objects (in step 1820). The touring server then dispatches this HTML page to the touring client (in step 1830) and starts a timer (in step 1840) enforcing the presentation duration of this touring element.

The touring server may also receive touring interactivity events from the touring client (in step 1850). There are several possible cases. The user may want to terminate the tour, in which case a TourEnd request (in step 1860) is received by the touring server. The user may want to pause the current tour on which case a TourPause request (in step 1870) is received by the touring server. The user may want to resume a tour, on which case a TourResume request (in step 1880) is sent to the touring server. The timer associated with the temporal URL may expire (in step 1895). Last, some touring elements require user input such as in the case of the tour anchor (FIG. 19). In a preferred embodiment, the touring server does not run a timer for such touring elements but rather waits for a response from the user (in step 1885). The response provided is processed by the touring server. In our preferred embodiment, the touring server collects statistics (describe in further detail with regard to FIGS. 21 and 22) to analyze such response (in step 1890) and dynamically recommends and customizes (in step 1895) the remaining touring experience of this touring client. An example of a dynamic customization proceeds as follows. First, retrieve the next touring element. Then apply the token bag (in step 1805) associated with this touring client to the dynamic recommendation engine (in step 1825) to generate a recommendation. For example, in a preferred embodiment of a touring anchor, the recommendation includes the steps of associating and inserting recommendation weights to the various touring options. In general, for all types of touring elements, the recommendation may include dropping the touring element from the tour (in step 1815).

FIG. 19 illustrates an example of a typical anchor page as presented by a touring client. As depicted, the anchor page (1900) gives a user coarse-grained control over a touring experience. Control may be of the form of: frames vs. no frames (1910); preferred touring duration (1920); initial components of the token bag (1960) such as "shoes", "shirts", "jeans", "jackets", etc. (1930); and miscellaneous options relevant to the tour (such as the language used e.g., English or Spanish) (1940), etc. The user input collected by the touring anchor page will be forwarded to the touring server (step 1885, FIG. 18) for analysis and dynamic customization (steps 1890, 1825, FIG. 18) of this user's touring experience. Note that based on past history, recommendations are shown (1950) along with the different touring choices. One skilled in the art will appreciate that the form of this recommendation, i.e., whether it is provided as a numerical value or a graphical value such as a color coded rating such as increasing shades of red, is an implementation issue. One skilled in the art will similarly see that the recommendation does not need to be visible all the time but it can be made visible after an explicit request such as by having the user click on a "Recommend" (1970) request button within the anchor page.

Figure 20:
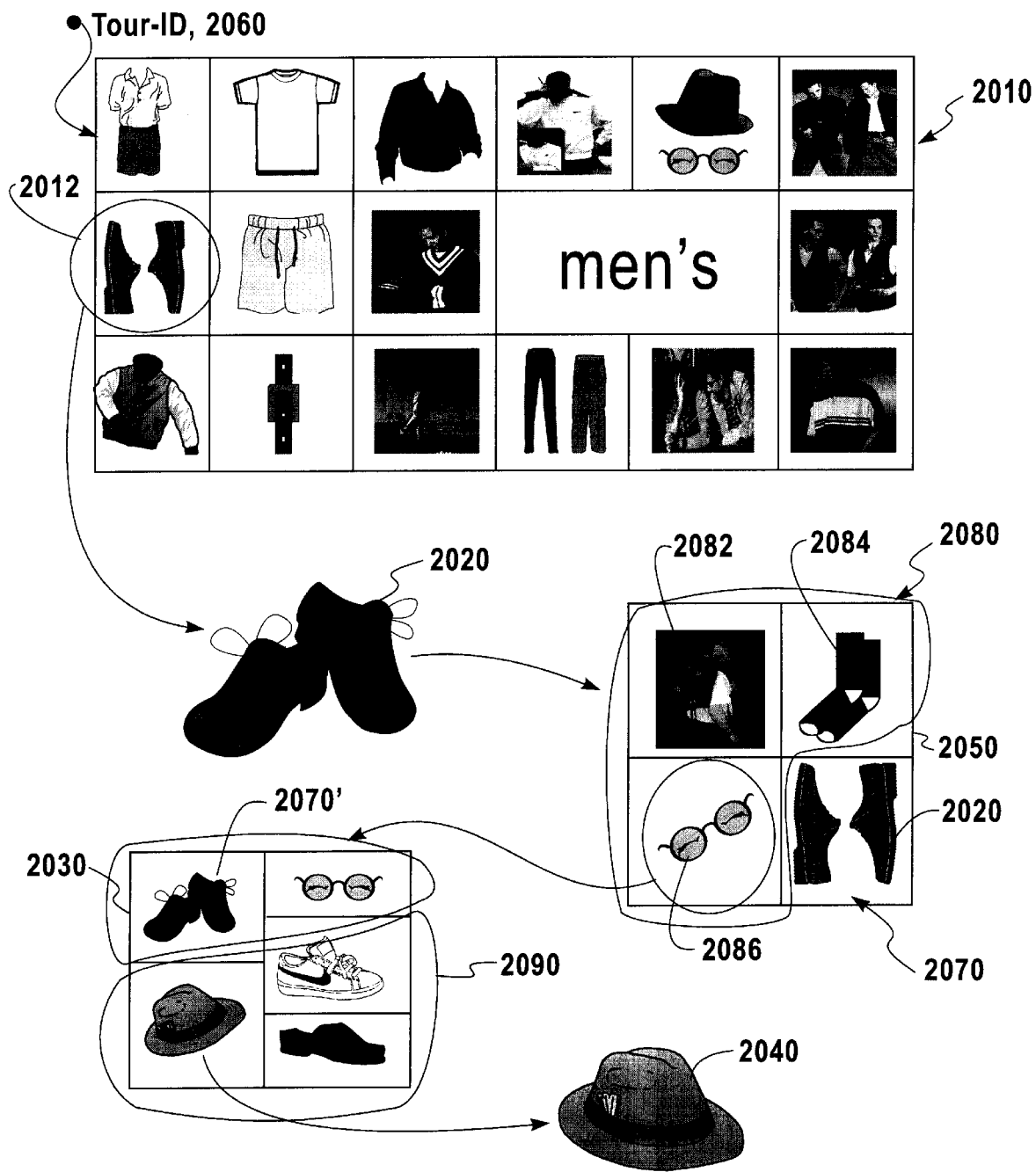
FIG. 20 shows an example of a tour containing multiple anchor pages.

FIG. 20 shows an example of a complex "virtual shopping tour" including multiple anchor pages with associated dynamic customization to customize E-commerce to a touring user. As depicted (and with reference to FIG. 18), the tour-id (2060) is used by the user to enter a virtual mall storefront for a Spring/Summer sale. Based on the profile of this user and the user's token bag (step 1805), the storefront is dynamically customized (step 1825) for this user (e.g., "casual", "summer", "men", clothes). The storefront is implemented as an anchor page (2010) containing multiple recommendations about items such as shorts, footwear, shirts, hats, etc. found to be of interest to other like-minded users. The user then selects one of these options (e.g., "shoes" (2012)) causing the anchor page (2010) to be replaced with a Web object (2020) containing an enhanced view and information about the selected item. Based on the token bag (2070) associated with this user, the touring server produces a dynamic recommendation (step 1825) that results in the presentation of a new anchor page (2050) containing recommendations of various Web objects (2080) ("backpack" (2082), "socks" (2084), and "glasses" (2086)) found to have membership in the token bag (2070) (i.e., "shoes") for this user. Preferably, the anchor pages can be used to allow a virtual store to bring attention to recommendation and referrals such as "By the way, these sale items are recommended to go with your shoes"). We envision that the associated Web objects could be part of a cross-selling process to other virtual mall sites. Assuming the user chooses the glasses, the touring server can, for example, produce another dynamic customization of the remaining Spring/Summer catalog tour, this time to include Web objects with associations with the token bag (2070') contents "shoes" and "glasses". This time, the user is presented with another anchor page (2030) containing recommendations of various Web objects (2090) ("hat", "sandals," and "sneakers"). Lastly, the user chooses an option from this anchor page and is presented with a Web object (2040) containing information about the chosen item ("hat") (2040). In a preferred embodiment, the various Web objects can be associated with statistics. A reader versed in the art should note that the presentation form and details of these statistics is an implementation issue as one can present them next to each object or dynamically highlight and color-code the top recommendations. It is well known in the art to dynamically construct and/or modify web pages based on user information or profiles. According to the present invention, a tour can be dynamically constructed and/or Web objects can be dynamically inserted into a tour based on preference information or route information explicitly or implicitly provided during the tour.

Figure 21:
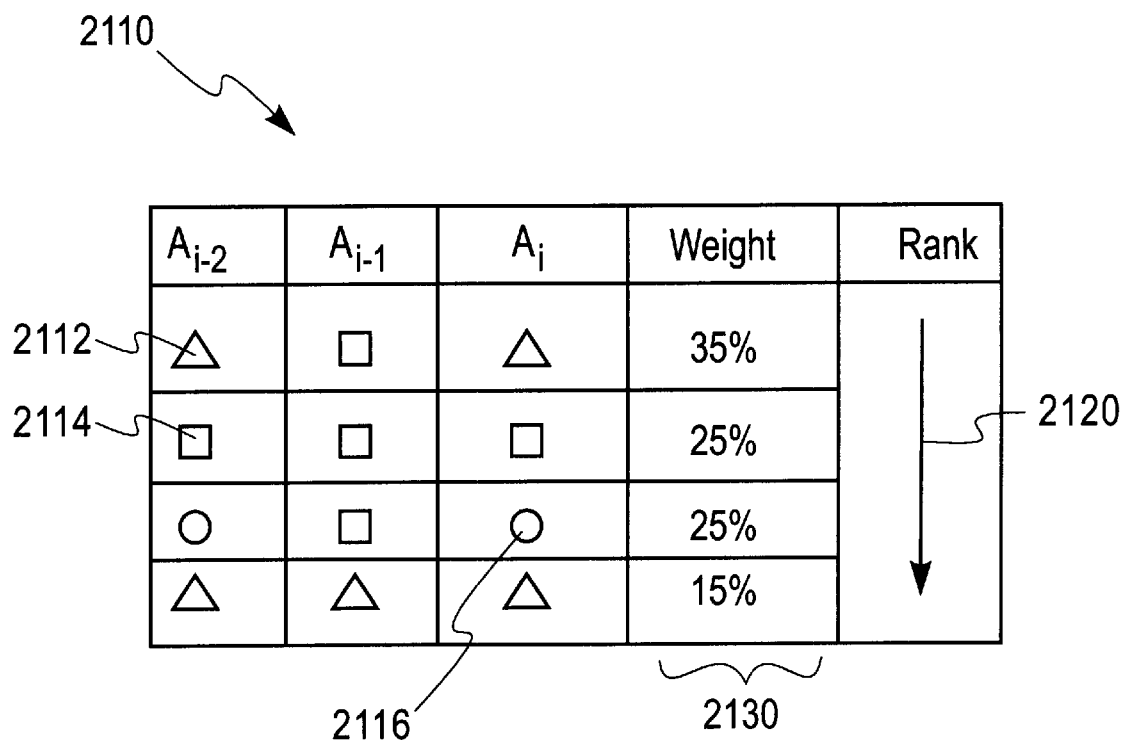
FIG. 21 shows an example of using statistics for tracking historical touring trends with respect to preceding anchor pages.

FIG. 21 shows an example of statistics associated with tracking past user touring behavior through anchor pages. As depicted, each tour option at an anchor (A) is labeled. The behavior of touring users can then be tracked in terms of their past (say i=3) touring anchor decisions (2110), including information related to the amount of time a user spends on each page. The nodes can be graphically labeled with tokens (2112 . . . 2116) and the permutations ranked across all touring users based on their touring frequency (2120). As is conventional, the ranking can also be normalized to produce a recommendation weight (2130). Given such user tracking, a touring anchor option can be recommended to a user at an $i^{th}$ anchor based on their like-minded-ness to other users of degree (i−1) given the users past (i−1) anchor choices.

Figure 22:
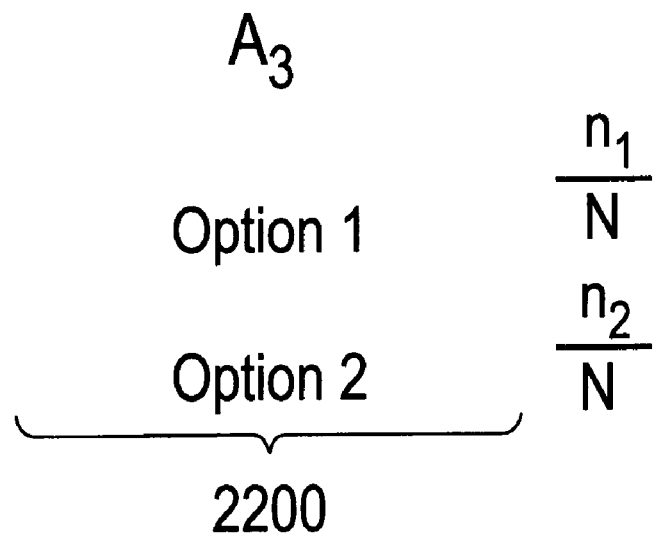
FIG. 22 shows an example of using statistics for generating recommendations with respect to options in an anchor page.
Figure 22:
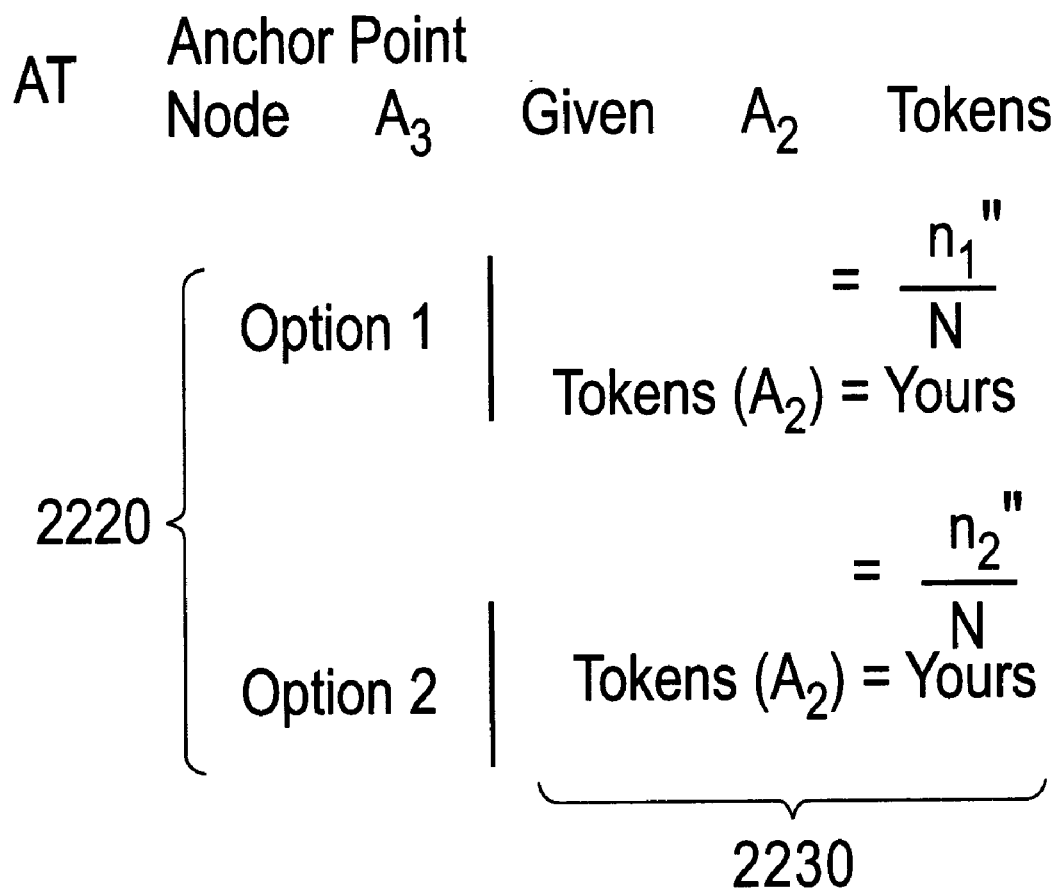

FIG. 22 shows two possible statistics associated for generating recommendations in our preferred embodiment. Let assume that an anchor A3 presents two options (option1 and option2) to an user (2200). In the preferred embodiment, the touring server can generate a dynamic recommendation for distinguishing among the options presented by the touring anchor A3. Option include: (a) a simple statistic such as the relative proportion of hits ($n_i/N$) where N is the total number of hits and $n_i$ is the number of hits that chose a given option i across all users (e.g., "when presented with this option, 20% of all users chose option1 and 80% chose option2"); or (b) a conditional statistic such as the relative proportion of hits for each option (2220) on anchor A3 given some trait about the user such as, for example, the current contents of the token bags (2230) associated with this user. One skilled in the art will note that various forms of conditional statistics are possible by either limiting the number of conditions to analyze (e.g., comparing the three most relevant tokens) or by associating a time horizon to the condition (e.g., comparing the past two most relevant tokens).

What things can be done with a tour? One skilled in the art will appreciate that a touring server could be adapted to observe user patterns in the exploration and navigation of arbitrary diversions and side tours and incorporate them into the collection presented by a tour. For example, if a large number of users branch out at similar stops during a tour to then (after exploration of a side-trip S) return to the tour stop, we could then dynamically refine the original tour with some variant of the side-trip S as a part of the tour itself. Furthermore, a reader versed in the art should note that any such sidetrip can be either one or more Web objects or a tour itself and that the presentation of a diversion or branch into side tour can be accomplished by opening a new browser window and associating a "child" touring client to this window.

Based on the customer information and/or statistics collected during a tour, customized advertisements and promotion can be dynamically inserted into the remainder of the tour. Furthermore, the dynamic customizable tour mechanism can be used to facilitate a dynamic customization in electronic commerce (E-commerce) (FIG. 20). A Web site can add carefully designed dynamic customizable tours to collect valuable customer information. This is a far better way to collect customer information as compared to asking customers to fill out questionnaires and/or forms, or to explicitly rating their preferences on a group of items or products. The present invention has features for dynamically and transparently providing the information for customized promotion, advertisement or dynamic construction of Web pages to suit customer interests.

Browsers enabled with the touring features of the present invention would be capable of interactive network-assisted navigation and/or touring of one more Web sites with abilities to branch out of a tour and resume the tour at the last node, and insert tours within a tour. One could envision the authoring of tours that integrate the content across multiple sites under a comprehensive view. For example, a tour can visit virtual museums across the world and provides a retrospective on a renowned artist such as Picasso. Similarly, because tours provide a vehicle for online comparison, a tour can provide a comparative view to specifications for competing products. As single sites become increasingly more complex, a tour can be used as a vehicle for the exploration of a site. This might be useful to corporations, for example which use their intranets to distribute, large amounts of documentation to its employees such as human resource manuals, etc. Tours can also be used as an artifact for exchanging viewpoints between users. For example, users could construct tours to represent viewpoints, and rather than exchange URLs, they could exchange tour handles. Such would be of use for facilitating distance learning.

Furthermore, a tour could asynchronously deliver a recommended traversal path to a set of users and let them individually experience and interact with it.

Now that the invention has been described in terms of a preferred embodiment with alternatives, those skilled in the art will recognize certain equivalents, modifications, and alternatives can be practiced within the spirit and scope of the appended claims.

We claim:

1. A method for touring a dynamic collection of objects distributed over a computer network, the method comprising the steps of:

traversing a tour sequence of a tour, wherein the tour sequence comprises a plurality of tour stops and at least one interactivity stop within the tour sequence;

collecting user preference information at an interactivity stop in the tour sequence;

dynamically adapting tour stops in the tour sequence following the interactivity stop, if necessary, based on collected user preference information;

dynamically generating and inserting an additional interactivity stop in the tour sequence, if necessary, based on collected user preference information;

presenting navigation recommendations at an interactivity stop;

dynamically customizing the navigation recommendations presented at an interactivity stop in the tour sequence, if necessary, based on collected user preference information;

collecting user navigation route information while traversing the tour, wherein the step of collecting user navigation route information comprises collecting a token associated with each tour stop, and generating touring statistics based on the collected tokens; and utilizing the user navigation route information for one of dynamically adapting the tour sequence, dynamically customizing navigation recommendations, and a combination thereof, wherein the step of traversing the tour comprises the step of simultaneously traversing a plurality of tour paths, and wherein the step of simultaneously traversing a plurality of tour paths comprises concurrently displaying each tour path in separate, synchronized browser windows.

2. The method of claim 1, wherein the step of dynamically adapting comprises one of dynamically inserting a tour stop, dynamically deleting a tour stop, re-ordering remaining tour stops, updating a remaining tour stops, adjusting presentation time of a tour stop, and a combination thereof.

3. The method of claim 1, wherein the step of presenting navigation recommendations comprises the steps of providing a plurality of alternative tour paths for selection by the user.

4. The method of claim 3, wherein alternative tour paths can be of different functionality comprising one of with or without audio, with or without video with or without frames, with or without graphics and graphics resolution, and a combination thereof.

5. The method of claim 1, further comprising the steps of:

maintaining for the user a collection of tokens that are collected during the tour; and displaying the collection of tokens at an interactivity stop.

6. The method of claim 5, wherein the step of collecting user preference information at an interactivity stop comprises modifying the collection of tokens displayed at the interactivity stop.

7. The method of claim 1, further comprising the steps of dynamically adapting tour stops in the tour sequence and dynamically providing navigation recommendations at an interactivity stop based on collected user preference information of like-minded users.

8. The method of claim 1, further comprising the step of providing feedback on an impact of a dynamic adaption of the tour sequence, if any, based on user preference information collected at an interactivity stop.

9. The method of claim 1, wherein the tour is a separate object from the elements comprising the tour sequence, and further comprising the step of preserving a continuity of a view imposed by the tour sequence despite the absence of one or more elements in the tour sequence.

10. The method of claim 9, further comprising the steps of:
storing the tour in a database;
retrieving the tour by means of a tour ID; and
distributing and exchanging the tour by exchanging the tour ID, without exchanging and reproducing the elements comprising the tour.

11. The method of claim 1, further comprising the steps of:
collecting one or more of user profile and specifications at the beginning of the tour including device characteristics comprising one of video processing capabilities, video resolution, graphics resolution, and a combination thereof.

12. The method of claim 1, further comprising the step of:
detecting a touring breakpoint operator in the tour sequence; and
dynamically inserting an object in the tour sequence upon said detecting.

13. The method of claim 12, wherein the dynamically inserted object comprises an advertisement.

14. The method of claim 12, wherein the dynamically inserted object comprises a Web object.

15. The method of claim 12, wherein the dynamically inserted object is a side-tour, and further comprising the step of entering into the side tour from the original tour sequence; and returning to a point in the original tour once the side tour is complete.

16. The method of claim 1, wherein the method is implemented for electronic commerce.

17. A method for touring a dynamic collection of objects distributed over a computer network, the method comprising the steps of:
traversing a tour sequence of a tour, wherein the tour sequence comprises a plurality of tour stops and at least one interactivity stop within the tour sequence, and wherein the tour sequence comprises an ordered collection of tour elements, wherein each tour stop and interactivity stop in the tour sequence is associated with a tour element, wherein each tour element associated with tour stops comprises data fields comprising (1) an amount of tour stops associated with the tour element, (2) a link to each tour stop associated with the tour element, (3) a touring operating type of the tour stops associated with the tour element and (4) a presentation duration of the touring element, and wherein the tour element associated with tour stops further comprises a list of tokens corresponding to each tour stop associated with the tour element, wherein each token represents a content indicator for the tour stop;
collecting user preference information at an interactivity stop in the tour sequence;
dynamically adapting tour stops in the tour sequence following the interactivity stop, if necessary, based on collected user preference information; and
dynamically generating and inserting an additional interactivity stop in the tour sequence, if necessary, based on collected user preference information,
wherein the step of traversing the tour comprises the step of simultaneously traversing a plurality of tour paths, and wherein the step of simultaneously traversing a plurality of tour paths comprises concurrently displaying each tour path in separate, synchronized browser windows.

18. The method of claim 17, comprising the step of displaying each tour stop in one of a separate browser window and frame for the duration specified by the tour element.

19. The method of claim 17, wherein a touring operation type comprises a touring operator for one of (1) presenting a serial sequence of the tour stops associated with the tour element, (2) presenting a parallel sequence of the tour stops associated with the tour element, and (3) enabling user-selection of alternative sequences of tour stops associated with the tour element.

20. The method of claim 17, wherein a tour element associated with an interactivity point comprises a zero value in the data field of the tour element corresponding to the presentation duration.

21. The method of claim 17, further comprising the steps of:
collecting and maintaining touring statistics;
identifying a preferred selection of a group of like-minded users having similar touring statistics; and
dynamically updating tour stops in the tour sequence based on the tour statistics of the like-minded users.

22. A method for touring a dynamic collection of objects distributed over a computer network, the method comprising the steps of:
traversing a tour sequence of a tour, wherein the tour sequence comprises a plurality of tour stops and at least one interactivity stop within the tour sequence;
collecting user preference information at an interactivity stop in the tour sequence;
dynamically adapting tour stops in the tour sequence following the interactivity stop, if necessary, based on collected user preference information; and
dynamically generating and inserting an additional interactivity stop in the tour sequence, if necessary, based on collected user preference information,
wherein the tour stops comprise Web objects, further comprising the steps of:
associating each web object with at least one token to semantically indicate content of the web object;
capturing tokens from visited Web objects during the traversal of the tour; and
maintaining a collection of tokens that are captured;
wherein the step of collecting user preference information at an interactivity stop comprises the steps of:
displaying the collection of tokens at an interactivity stop; and
one of inserting, disabling, modifying, and a combination thereof, one or more tokens in the displayed collection of tokens.

23. The method of claim 20, wherein the step of dynamically adapting the tour sequence comprises omitting those Web objects having negligible membership in a class of disabled tokens.

24. The method of claim 20, wherein the step of dynamically adapting the tour sequence comprises adding Web objects having tokens associated therewith that are added by the user to the collection of tokens.

25. The method of claim 22, wherein a plurality of types of tokens are based on a standard.

* * * * *